US012763270B2

(12) United States Patent
Tannhäuser

(10) Patent No.: US 12,763,270 B2
(45) Date of Patent: Oct. 13, 2026

(54) CIRCUIT BREAKER DEVICE AND METHOD

(71) Applicant: Siemens Aktiengesellschaft, Munich (DE)

(72) Inventor: Marvin Tannhäuser, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 194 days.

(21) Appl. No.: 18/696,486

(22) PCT Filed: Sep. 12, 2022

(86) PCT No.: PCT/EP2022/075295
§ 371 (c)(1),
(2) Date: Mar. 28, 2024

(87) PCT Pub. No.: WO2023/052117
PCT Pub. Date: Apr. 6, 2023

(65) Prior Publication Data

US 2025/0046538 A1 Feb. 6, 2025

(30) Foreign Application Priority Data

Sep. 28, 2021 (DE) ..................... 10 2021 210 834.2

(51) Int. Cl.
*H01H 9/54* (2006.01)

(52) U.S. Cl.
CPC .................................. *H01H 9/548* (2013.01)

(58) Field of Classification Search
CPC ............................. H01H 9/547; H01H 9/548
(Continued)

(56) References Cited

U.S. PATENT DOCUMENTS 11,538,642 B2 12/2022 Hussmann
2016/0314928 A1 10/2016 Niehoff
(Continued)

FOREIGN PATENT DOCUMENTS

DE 102018213354 A1 2/2020
DE 102019213604 A1 3/2021
(Continued)

OTHER PUBLICATIONS

Machine translation of Koshin et al. International Patent Document WO 2009/084503 A1 Jul. 2009 (Year: 2009).*

*Primary Examiner* — Kevin J Comber
(74) *Attorney, Agent, or Firm* — Laurence A. Greenberg; Werner H. Stemer; Ralph E. Locher

(57) ABSTRACT

A circuit breaker device protects an electric low-voltage circuit. The circuit breaker device contains a housing having a grid-side connection and one load-side connection and a mechanical separating contact unit which is connected to an electronic interruption unit in series. The mechanical separating contact unit is associated with the load-side connection and the electronic interruption unit is associated with the grid-side connection. The mechanical separating contact unit can be switched by opening contacts to prevent a current flow or closing the contacts for a current flow in the low-voltage circuit. As a result of semiconductor-based switch elements, the electronic interruption unit can be switched to a high-ohmic state of the switch elements to prevent a current flow or to a low-ohmic state of the switch elements for a current flow in the low-voltage circuit.

30 Claims, 14 Drawing Sheets

(58) Field of Classification Search
USPC .......................................................... 361/88
See application file for complete search history.

(56) References Cited

U.S. PATENT DOCUMENTS

| | | | | |
|---|---|---|---|---|
| 2020/0083699 | A1 | 3/2020 | Kennedy et al. | |
| 2020/0366078 | A1 | 11/2020 | Telefus et al. | |
| 2020/0366079 | A1 * | 11/2020 | Telefus .................. | H01H 9/563 |
| 2021/0066013 | A1 | 3/2021 | Kumar et al. | |
| 2021/0126447 | A1 * | 4/2021 | Miller .................... | H01H 71/58 |
| 2022/0139644 | A1 * | 5/2022 | Niehoff .................... | H02H 9/02<br>200/42.01 |
| 2022/0337046 | A1 | 10/2022 | Erven | |

FOREIGN PATENT DOCUMENTS

| | | | | |
|---|---|---|---|---|
| EP | 3080831 | A1 | 10/2016 | |
| WO | WO-2009084503 | A1 * | 7/2009 | ............ H01H 9/548 |

* cited by examiner

CIRCUIT BREAKER DEVICE AND METHOD

FIELD AND BACKGROUND OF THE INVENTION

The invention relates to the technical field of a circuit breaker device for a low-voltage circuit having an electronic interruption unit and to a method for a circuit breaker device for a low-voltage circuit having an electronic interruption unit.

Low voltage is used to mean voltages of up to 1000 volts AC or up to 1500 volts DC. Low voltage is used to mean, in particular, voltages which are greater than the extra-low voltage, with values of 50 volts AC or 120 volts DC.

A low-voltage circuit or network or system is used to mean circuits having nominal currents or rated currents of up to 125 amperes, more specifically up to 63 amperes. A low-voltage circuit is used to mean, in particular, circuits having nominal currents or rated currents of up to 50 amperes, 40 amperes, 32 amperes, 25 amperes, 16 amperes or 10 amperes. The current values mentioned are used to mean, in particular, nominal, rated or/and switch-off currents, that is to say the current which is normally conducted at most via the circuit, or for which the electrical circuit is usually interrupted, for example by a protection device such as a circuit breaker device, a miniature circuit breaker or a power circuit breaker. The nominal currents can be scaled further from 0.5 A, via 1 A, 2 A, 3 A, 4 A, 5 A, 6 A, 7 A, 8 A, 9 A, 10 A, etc., to 16 A.

Miniature circuit breakers are overcurrent protection devices which have been known for a long time and are used in electrical installation technology in low-voltage circuits. They protect lines from damage caused by heating on account of an excessively high current and/or a short circuit. A miniature circuit breaker can automatically switch off the circuit in the event of an overload and/or a short circuit. A miniature circuit breaker is a fuse element which does not automatically reset.

In contrast to miniature circuit breakers, power circuit breakers are provided for currents of greater than 125 A, sometimes also even above 63 amperes. Miniature circuit breakers therefore have a simpler and more delicate design. Miniature circuit breakers usually have a fastening possibility for fastening on a so-called top-hat rail (mounting rail, DIN rail, TH35).

Miniature circuit breakers have an electromechanical design. In a housing, they have a mechanical switching contact or shunt opening release for interrupting (tripping) the electrical current. A bimetallic protection element or bimetallic element used is usually for tripping (interruption) in the case of a longer-lasting overcurrent (overcurrent protection) or in the event of a thermal overload (overload protection). An electromagnetic release with a coil is used for brief tripping if an overcurrent limit value is exceeded or in the event of a short circuit (short-circuit protection). One or more arc quenching chamber(s) or arc quenching devices are provided. Connection elements for conductors of the electrical circuit to be protected are also provided.

Circuit breaker devices having an electronic interruption unit have are relatively new developments. They a semiconductor-based electronic interruption unit. That is to say, the electrical current flow in the low-voltage circuit is conducted via semiconductor components or semiconductor switches which can interrupt the electrical current flow or can be switched to be conductive. Circuit breaker devices having an electronic interruption unit also often have a mechanical isolating contact system, in particular with isolator properties according to relevant standards for low-voltage circuits, wherein the contacts of the mechanical isolating contact system are connected in series with the electronic interruption unit, that is to say the current of the low-voltage circuit to be protected is conducted both via the mechanical isolating contact system and via the electronic interruption unit.

The present invention relates, in particular, to low-voltage AC circuits having an AC voltage, usually having a time-dependent sinusoidal AC voltage of the frequency f. The temporal dependence of the instantaneous voltage value u(t) of the AC voltage is described by the equation:

$$u(t) = U * \sin\left(2\prod * f * t\right),$$

where:

u(t)=instantaneous voltage value at the time t

U=amplitude of the voltage

A harmonic AC voltage can be represented by the rotation of a phasor, the length of which corresponds to the amplitude (U) of the voltage. The instantaneous deflection is the projection of the phasor onto a coordinate system. An oscillation period corresponds to a full revolution of the phasor and its full angle is 2π (2pi) or 360°. The angular frequency is the rate of change of the phase angle of this rotating phasor. The angular frequency of a harmonic oscillation is always 2π times its frequency, that is to say:

$$\omega = 2\prod * f = 2\prod /T = \text{angular frequency of the AC voltage}$$

(T=period duration of the oscillation)

It is often preferred to give the angular frequency (@) rather than the frequency (f), since many formulae in oscillation theory can be represented more compactly using the angular frequency due to the occurrence of trigonometric functions, the period of which is by definition 2*n*:

$$u(t) = U * \sin(\omega t)$$

In the case of angular frequencies that are not constant over time, the term instantaneous angular frequency is also used.

In the case of a sinusoidal AC voltage, in particular an AC voltage that is constant over time, the time-dependent value formed from the angular velocity ω and the time t corresponds to the time-dependent angle φ(t) which is also referred to as the phase angle φ(t). That is to say, the phase angle φ(t) periodically passes through the range 0 . . . 2π or 0° . . . 360°. That is to say, the phase angle periodically assumes a value of between 0 and 21 or 0° and 360° (φ=n*(0 . . . 2π) or φ=n*(0° . . . ) 360° on account of periodicity; in abbreviated form: φ=0 . . . 2π or φ=0° . . . 360°).

The instantaneous voltage value u(t) is therefore used to mean the instantaneous value of the voltage at the time t, that is to say, in the case of a sinusoidal (periodic) AC voltage, the value of the voltage at the phase angle φ (φ=0 . . . 2π or φ=0° . . . 360°, of the respective period).

SUMMARY OF THE INVENTION

The object of the present invention is to improve a circuit breaker device of the type mentioned at the outset, in particular to improve the safety of such a circuit breaker device or to achieve a higher degree of safety in the electrical low-voltage circuit to be protected by the circuit breaker device.

This object is achieved by means of a circuit breaker device having the features of the independent circuit breaker device patent claim and by means of a method according to the independent method patent claim.

The invention proposes a circuit breaker device for protecting an electrical low-voltage circuit, in particular a low-voltage AC circuit, having:

a housing with at least one network-side connection and one load-side connection, an (in particular two-pole) mechanical isolating contact unit which is connected in series with an (in particular single-pole) electronic interruption unit, wherein the mechanical isolating contact unit is assigned to the load-side connection and the electronic interruption unit is assigned to the network-side connection, (in particular one pole of the (two-pole) mechanical isolating contact unit is connected in series with one (the) pole of the (single-pole) electronic interruption unit)

wherein the mechanical isolating contact unit can be switched by opening contacts in order to avoid a current flow 16 or closing the contacts for a current flow in the low-voltage circuit, wherein the electronic interruption unit can be switched, by means of semiconductor-based switching elements, to a high-impedance state of the switching elements in order to avoid a current flow or a low-impedance state of the switching elements for the current flow in the low-voltage circuit, a current sensor unit for determining the level of the current of the low-voltage circuit, a control unit which is connected to the current sensor unit, the mechanical isolating contact unit and the electronic interruption unit, wherein avoidance of a current flow in the low-voltage circuit is initiated if current limit values or/and current-time limit values are exceeded.

According to the invention, the circuit breaker device is configured in such a manner that the level of the voltage across the electronic interruption unit can be determined for one conductor. That is to say, the level of the voltage across the electronic interruption unit is determined for one pole.

In particular, the level of the voltage between a network-side connecting point and a load-side connecting point of the electronic interruption unit can be determined according to the invention. In particular, the level of the voltage across the electronic interruption unit is determined in one phase conductor (or in all phase conductors) of the (especially single-phase or three-phase) low-voltage AC circuit.

The functionality of the electronic interruption unit can be determined according to the invention by determining the level of the voltage across the electronic interruption unit. The invention therefore proposes a new architecture or design of a circuit breaker device.

Advantageous configurations of the invention are specified in the subclaims and in the exemplary embodiment.

In one advantageous configuration of the invention, a first voltage sensor unit which is connected to the control unit is provided and determines the level of a first voltage across the electronic interruption unit (as the level of the voltage across the electronic interruption unit), in particular between a network-side connecting point (which is assigned to the network-side connection) and a load-side connecting point (which is assigned to the load-side connection) of the electronic interruption unit.

This has the particular advantage that there is a simple solution with only one voltage sensor unit.

In one advantageous alternative configuration of invention, the network-side connection has a network-side neutral conductor connection and a network-side phase conductor connection. A second voltage sensor unit which is connected to the control unit is provided and determines the level of a second voltage between the network-side neutral conductor connection and the network-side phase conductor connection.

A third voltage sensor unit which is connected to the control unit is provided and determines the level of a third voltage between the network-side neutral conductor connection and a load-side connecting point of the electronic interruption unit.

The circuit breaker device is configured in such a manner that the level of a/the first voltage is determined (as the level of the voltage across the electronic interruption unit) from the difference between the second and third voltages (that is to say, in particular, between a network-side connecting point and the load-side connecting point of the electronic interruption unit).

This has the particular advantage that there is a further solution based on conventional voltage measurements. In addition, a further-reaching check of the circuit breaker device is enabled by means of two voltage sensor units.

In one advantageous configuration of the invention, the current sensor unit is provided on the circuit side between the network-side phase conductor connection and the load-side phase conductor connection.

This has the particular advantage that there is a compact two-part design of the device, with an electronic interruption unit in the phase conductor in addition to the current sensor unit, on the one hand, and a continuous neutral conductor, on the other hand. Furthermore, further monitoring of currents both in the circuit itself and in the case of ground fault currents is achieved with a current sensor unit in the phase conductor.

In one advantageous configuration of the invention, a measurement impedance is connected between the network-side connection points of the mechanical isolating contact unit.

In particular, the measurement impedance is an electrical resistor or/and capacitor, that is to say an individual element or a series or parallel circuit of two elements.

In particular, the measurement impedance should have a high resistance value or impedance value in order to advantageously keep the losses low. In particular, resistance values of greater than 100 kOhm, 500 kOhm, preferably 1 MOhm, MOhm, 3 MOhm, 4 MOhm, 5 MOhm or greater should be provided. In a 230 V low-voltage circuit, the use of a measurement resistance of 1 MOhm, for example, results in losses of approximately 50 mW.

This has the particular advantage that there is a better check of the functionality of the electronic interruption unit, in particular when isolating contacts are open, especially in the case of the inventive architecture of the circuit breaker.

In one advantageous configuration of the invention, (in addition to the first voltage sensor unit only) a second voltage sensor unit is provided and determines the level of the voltage between the network-side neutral conductor connection and the network-side phase conductor connection.

This has the particular advantage that a further-reaching check of the circuit breaker device is enabled.

In one advantageous configuration of the invention, the low-voltage circuit is a three-phase AC circuit. The circuit breaker device has further network-side and load-side phase conductor connections in order to protect the phases of the electrical circuit. A series circuit of a (possibly further) electronic interruption unit and a (further) contact of the mechanical isolating contact unit is respectively provided between each of the network-side and load-side phase conductor connections. Further voltage sensor units according to the invention, in particular first voltage sensor units, are provided. A current sensor unit may also be provided.

This has the particular advantage that three-phase AC circuits can be protected.

In one advantageous configuration of the invention, the circuit breaker device is configured in such a manner that the contacts of the mechanical isolating contact unit can be opened, but not closed, by the control unit.

This has the particular advantage that increased operational safety is achieved since the contacts cannot be inadvertently closed by the control unit.

In one advantageous configuration of the invention, the mechanical isolating contact unit can be operated by means of a mechanical handle in order to switch opening of contacts or closing of the contacts.

This has the particular advantage that there is the functionality of a conventional miniature circuit breaker.

In one advantageous configuration of the invention, the mechanical isolating contact unit is configured in such a manner that it is possible to close the contacts by means of the mechanical handle only after an enable (enable), in particular an enable signal.

This has the particular advantage that there is increased protection and increased operational safety since a defective circuit breaker is prevented from being switched on.

In one advantageous configuration of the invention, an energy supply, in particular for the control unit, is provided and is connected to the network-side neutral conductor connection and to the network-side phase conductor connection.

In particular, a fuse, in particular a safety fuse, is provided in the link to the network-side neutral conductor connection. In particular, the measurement impedance can advantageously be connected to the network-side neutral conductor connection via the fuse.

This has the particular advantage that a compact electronic assembly is enabled. Furthermore, there is only a cross-connection between the phase conductor and the neutral conductor, with the result that a fault in the device, which would cause a short circuit here, can be easily protected.

In one advantageous configuration of the invention, when the contacts of the mechanical isolating contact unit are closed and the interruption unit has a low impedance and

- when a current that exceeds a first current value is determined, in particular the first current value is exceeded for a first time limit, the electronic interruption unit comes to have a high impedance and the mechanical isolating contact unit remains closed,
- when a current that exceeds a (higher) second current value, in particular for a second time limit, is determined, the electronic interruption unit comes to have a high impedance and the mechanical isolating contact unit is opened,
- when a current that exceeds an (even higher) third current value is determined, the electronic interruption unit comes to have a high impedance and the mechanical isolating contact unit is opened.

This has the particular advantage that there is a graduated switch-off concept in the case of increased currents for a circuit breaker device according to the invention.

In one advantageous configuration of the invention, the circuit breaker device is configured in such a manner that, when the contacts of the mechanical isolating contact unit are open and the electronic interruption unit has been 11 switched to high impedance, the level of the voltage across 12 the electronic interruption unit is determined (in particular using the first voltage sensor unit). There is a first fault condition if a first voltage threshold value is undershot, with the result that the electronic interruption unit is prevented from coming to have a low impedance or/and closing of the contacts is prevented.

The first voltage threshold value could be a root-mean-square value/mean value/RMS value of the AC voltage. The first voltage threshold value could be an instantaneous value of the voltage. The comparison can be carried out using root-mean-square values or temporal instantaneous values.

This is used to check the electronic interruption unit with regard to its "ability to be switched off or the switched-off state", that is to say the semiconductor-based switching elements coming to have a high impedance or having a high impedance.

The first voltage threshold value is advantageously, for example, 5-15% of the nominal voltage or applied voltage of the low-voltage circuit, for example 10%. This applies both to root-mean-square values and to instantaneous values of the AC voltage, depending on the selected type of comparison. For example, it is also possible to measure at certain times of the instantaneous value of the AC voltage, for example at the time at which the instantaneous value of the AC voltage is +300 V or −300 V.

This has the particular advantage that it is easy to check the switch-off behavior of the electronic interruption unit.

In one advantageous configuration of the invention, the circuit breaker device is configured in such a manner that, when the contacts of the mechanical isolating contact unit are open and the electronic interruption unit has been switched to high impedance, the electronic interruption unit is switched to a low-impedance state for a first period of time. In this case, the level of the voltage across the electronic interruption unit is determined. There is a second fault condition if a second voltage threshold value is exceeded, with the result that the electronic interruption unit is prevented from further coming to have a low impedance or/and closing of the contacts is prevented.

The first period of time may be in the range of a few μs, for example 100 μs, to the seconds range. It is limited, in principle, only by the manual switching-on of the mechanical isolating contact unit. It may be, for example, in the range of 100 μs to 2 ms, for example 100 μs, 200 μs, . . . 1 ms, 2 ms. In the case of switching times in the range of 1 ms to 2 ms, a voltage change can be detected. The period of time may also be longer, for example up to 1 second. It is then possible to check whether, for instance, a voltage of 0 (instantaneous value or then also root-mean-square value of the voltage) is present across the electronic interruption unit (for a "longer period of time"). Since the contacts of the mechanical isolating contact unit are open, the period of time is limited only by the time until the contacts are closed. That is to say, longer or long test times to well over one second are also possible.

The first voltage threshold value should preferably be less than 1 V. The first voltage threshold value can be between 0 volts (or greater than 0 volts) and less than (for example 10% less than) the instantaneous value of the currently applied AC voltage (in particular when monitoring or comparing instantaneous values).

This has the particular advantage that the electronic interruption unit can be checked with regard to its "ability to be switched on" or switched-on state.

In one advantageous configuration of the invention, when there is a fault condition, closing of the contacts of the mechanical isolating contact unit is prevented. In particular, no enable signal (enable) is emitted to the mechanical isolating contact unit.

This has the particular advantage that only a functional circuit breaker device with a functional electronic interruption unit can be switched on. This increases operational safety in the low-voltage circuit. It is therefore ensured that the ability of the electronic interruption unit to be switched on and off functions.

In one advantageous configuration of the invention, the circuit breaker device is configured in such a manner that, when the contacts of the mechanical isolating contact unit are closed and the electronic interruption unit has been switched to high impedance, the electronic interruption unit is switched to a low-impedance state for a second period of time. In this case (in the low-impedance state), the level of the voltage across the electronic interruption unit is determined. If a third voltage threshold value is exceeded, there is a third fault condition which prevents the electronic interruption unit from being switched to low impedance or/and initiates opening of the contacts.

The third voltage threshold value should preferably be less than 1 V. The third voltage threshold value may be between 0 volts (or greater than 0 volts) and less than (for example 10% less than) the instantaneous value of the currently applied AC voltage (in particular when monitoring or comparing instantaneous values).

The second period of time may be short. For example, the second period of time may be less than 2 ms or 1 ms, in particular 500 µs or 100 µs, for example.

This has the particular advantage that it is possible to check the ability of the electronic interruption unit to be switched on or the switched-on state of the latter even in this operating state. A brief measurement has the advantage that the load is only briefly supplied with energy.

In one advantageous configuration of the invention, the electronic interruption unit is switched to a low-impedance state when the instantaneous value of the voltage between the network-side neutral conductor connection and the network-side phase conductor connection undershoots a fourth voltage threshold value.

The fourth voltage threshold value may be a value of the (protective) extra-low-voltage. For example, the fourth voltage threshold value may be 50 V.

This has the particular advantage that the ability of the electronic interruption unit to be switched on is checked using a voltage or at times of the voltage level that is safe. This high achieves operational safety when simultaneously checking the circuit breaker device.

In one advantageous configuration of the invention, the circuit breaker device is configured in such a manner that, when the contacts of the mechanical isolating contact unit are closed and the electronic interruption unit has been switched to low impedance, the level of the voltage across the electronic interruption unit is determined. If the fifth voltage threshold value is exceeded, there is a fourth fault condition which initiates the electronic interruption unit coming to have a high impedance or/and initiates opening of the contacts.

The fifth voltage threshold value should be less than 1 V. Ideally, the fifth voltage threshold value is dependent on the level of the measured instantaneous value (also root-mean-square value, RMS value) of the current.

As an alternative to the voltage threshold value or for this, a resistance value of the electronic interruption unit can be determined from the measured voltage value and the measured current value (for example instantaneous values at a certain time; alternatively root-mean-square values or RMS values). The determined resistance value is compared with a first resistance threshold value. If the first resistance threshold value is exceeded, there is the fourth fault condition which initiates the electronic interruption unit coming to have a high impedance or/and initiates opening of the contacts.

The first resistance threshold value depends on the electronic interruption unit, in particular the semiconductor-based switching element. For example, the first resistance threshold value is twice as high as the resistance of the electronic interruption unit in the intact, in particular cold, state. For example, it may be less than 100 MOhm, in particular less than 50 MOhm.

This has the particular advantage that the electronic interruption unit is checked during ongoing operation and avoidance of a current flow in the low-voltage circuit is initiated if the electronic interruption unit is faulty, with the result that there is a safe state.

In one advantageous configuration of the invention, the circuit breaker device is configured in such a manner that, when the contacts of the mechanical isolating contact unit are closed and the electronic interruption unit has been switched to low impedance, the electronic interruption unit is switched to a high-impedance state for a third period of time. The level of the voltage across the electronic interruption unit is determined in the high-impedance state. If a sixth voltage threshold value is undershot, there is a fifth fault condition which initiates the electronic interruption unit coming to have a high impedance or/and initiates opening of the contacts.

The third period of time should preferably be very short. For example, the third period of time may be less than 20 ms, 10 ms, 5 ms, 2 ms or 1 ms, in particular less than 500 µs or 100 µs (any intermediate value is possible and disclosed).

As a result, the loads or consumers are advantageously not disconnected from the network for long.

The sixth voltage threshold value may be dimensioned like the first voltage threshold value. The sixth voltage threshold value may be dimensioned on the basis of the impedance or the resistance of the load or the load current, in particular the current that has previously flowed.

This has the particular advantage that the switch-off behavior or the ability of the electronic interruption unit to be switched off is checked easily during ongoing operation.

Furthermore, in the case of an energy absorber or overvoltage protection means within the electronic interruption unit, its functionality can also be advantageously checked. If current has previously flowed in the low-voltage circuit, the freewheeling current through or the resulting voltage across the energy absorber can be checked after the interruption unit has come to have a high impedance. If the electronic interruption unit is opened when there is a current flow, the voltage (on account of the inductance in the line circuit) increases to the voltage of the overvoltage protection means. The functionality of the energy absorber can therefore be checked. The electronic interruption unit can advantageously come to have a high impedance at the zero crossing of the current. This has the particular advantage that there is no chopping of the current. Furthermore, since the load is not supplied with any current at this moment, the measurement has less effect on the load. Furthermore, a commutation process (decrease in the current in the inductive circuit) does not take place and the electronic interruption unit (including the energy absorber) can turn off immediately.

In one advantageous configuration of the invention, the electronic interruption unit is switched to a high-impedance state when the instantaneous value of the voltage between the network-side neutral conductor connection and the network-side phase conductor connection exceeds a seventh voltage threshold value, in particular when the instantaneous value of the voltage is at a maximum.

This has the particular advantage that the supply of energy is briefly interrupted at a maximum of the available energy. Furthermore, the electronic interruption unit is checked under maximum voltage, with the result that a malfunction can be identified in good time.

The seventh voltage threshold value may be, for example, greater than 160 V, 200 V, 240 V or 300 V (any intermediate value is likewise possible). The instantaneous value of the voltage at a maximum is 325 volts (in the case of a 230 volt network).

In one advantageous configuration of the invention, the control unit has a microcontroller.

This has the particular advantage that the functions according to the invention for increasing the safety of a circuit breaker device or of the electrical low-voltage circuit to be protected can be achieved by means of an (adaptable) computer program product. Furthermore, changes and improvements in the function can be thereby individually loaded onto a circuit breaker device.

The invention claims a corresponding method for a circuit breaker device for a low-voltage circuit having electronic (semiconductor-based) switching elements with the same and further advantages.

The method for a circuit breaker device for protecting an electrical low-voltage circuit, having:

- a housing with at least one network-side connection and one load-side connection,
- an (in particular two-pole) mechanical isolating contact unit which is connected in series with an (in particular single-pole) electronic interruption unit, wherein the mechanical isolating contact unit is assigned to the load-side connection and the electronic interruption unit is assigned to the network-side connection, (in particular one pole of the (two-pole) mechanical isolating contact unit is connected in series with one pole of the (single-pole) electronic interruption unit),

- wherein the mechanical isolating contact unit can be switched by opening contacts in order to avoid a current flow or closing the contacts for a current flow in the low-voltage circuit,
- wherein the electronic interruption unit can be switched, by means of semiconductor-based switching elements, to a high-impedance state of the switching elements in order to avoid a current flow or a low-impedance state of the switching elements for the current flow in the low-voltage circuit,
- wherein the level of the current in the low-voltage circuit, in particular between the network-side phase conductor connection and the load-side phase conductor connection, is determined,
- wherein avoidance of a current flow in the low-voltage circuit is initiated if current limit values or/and current-time limit values are exceeded,
- wherein the level of the voltage across the electronic interruption unit is determined for one conductor.

That is to say, the level of the voltage of one pole across the electronic interruption unit is determined.

The invention claims a corresponding computer program product. The computer program product comprises instructions which, when the program is executed by a microcontroller, cause the latter to improve the safety of such a circuit breaker device or to achieve a higher degree of safety in the electrical low-voltage circuit to be protected by the circuit breaker device. The microcontroller is part of the circuit breaker device, in particular the control unit.

The invention claims a corresponding computer-readable storage medium on which the computer program product is stored.

The invention claims a corresponding data carrier signal which transmits the computer program product.

All configurations, both in dependent form referring back to the independent patent claims, and referring back only to individual features or combinations of features of patent claims, in particular also a reference of the dependent arrangement claims back to the independent method claim, improve a circuit breaker device, in particular improve the safety of a circuit breaker device or of the electrical circuit, and provide a new concept for a circuit breaker device.

The described properties, features and advantages of this invention and the manner in which they are achieved become clearer and more distinctly comprehensible in connection with the following description of the exemplary embodiments which are explained in more detail in connection with the drawing.

DETAILED DESCRIPTION OF THE INVENTION

Figure 1:
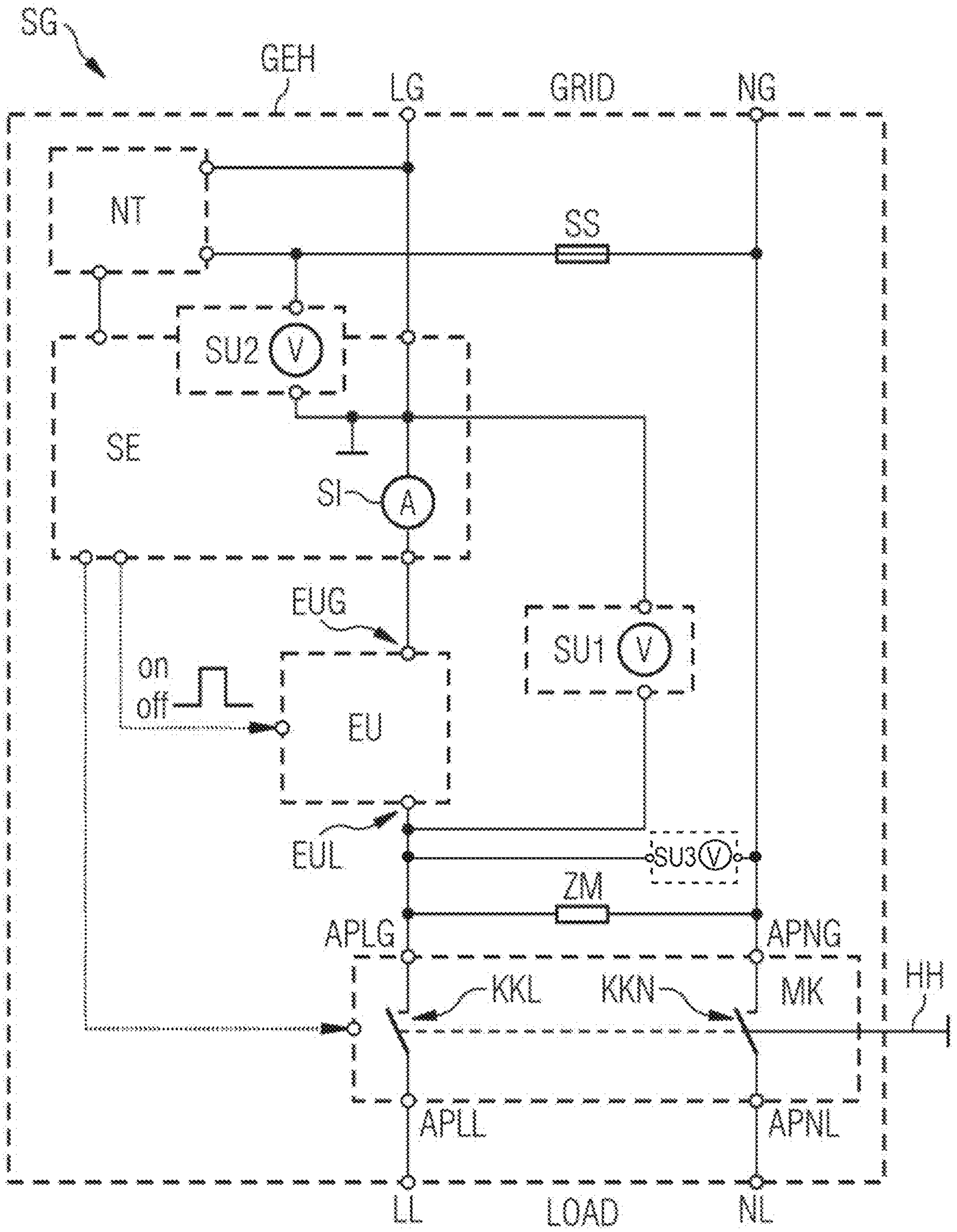
FIG. 1 shows a first illustration of a circuit breaker device.

FIG. 1 shows an illustration of a circuit breaker device SG for protecting an electrical low-voltage circuit, in particular a low-voltage AC circuit, having a housing GEH, having:

- at least one network-side connection, a network-side neutral conductor connection NG and a network-side phase conductor connection LG in the example,
- at least one load-side connection, a load-side neutral conductor connection NL and a load-side phase conductor connection LL of the low-voltage circuit in the example;

an energy source is usually connected to the network side GRID, a consumer is usually connected to the load side LOAD;

a mechanical isolating contact unit SG having load-side connection points APLL, APNL and network-side connection points APLG, APNG, wherein a load-side connection point APNL is provided for the neutral conductor, a load-side connection point APLL is provided for the phase conductor, a network-side connection point APNG is provided for the neutral conductor, and a network-side connection point APLG is provided for the phase conductor. The load-side connection points APNL, APLL are connected to the load-side neutral and phase conductor connections NL, LL, with the result that opening of contacts 11 KKN, KKL in order to avoid a current flow or closing of the contacts for a current flow in the low-voltage circuit can be switched, that is to say, the mechanical isolating contact unit is assigned to the load-side connection, an electronic interruption unit EU, in particular a single-pole electronic interruption unit (which is arranged, in particular, in the phase conductor in the case of a single-pole design), having a network-side connecting point EUG which is electrically connected to the network-side phase conductor connection LG, and a load-side connecting point EUL which is electrically connected to the network-side connection point APLG of the mechanical isolating contact unit MK, that is to say, the electronic interruption unit EU is assigned to the network-side connection, wherein the electronic interruption unit has, by virtue of semiconductor-based switching elements, a high-impedance state of the switching elements in order to avoid a current flow or a low-impedance state of the switching elements for the current flow in the low-voltage circuit, a current sensor unit SI for determining the level of the current of the low-voltage circuit, which current sensor unit is arranged, in particular, in the phase conductor, a control unit SE which is connected to the current sensor unit SI, the mechanical isolating contact unit MK and the electronic interruption unit EU, wherein avoidance of a current flow in the low-voltage circuit is initiated if current limit values or/and current-time limit values are exceeded.

According to the invention, the circuit breaker device is configured in such a manner that the level of the voltage 14 across the electronic interruption unit can be determined or is determined for one conductor (one pole).

According to the invention, a first voltage sensor unit SU1 which is connected to the control unit SE may be provided and determines the level of the voltage between the network-side connecting point EUG and the load-side connecting point EUL of the electronic interruption unit EU.

Alternatively, during the voltage measurement by the first voltage sensor unit SU1, the voltage across the series circuit of the electronic interruption unit EU and the current sensor SI can also be determined, as illustrated in FIG. 1.

The current sensor unit SI has a very low internal resistance, with the result that the determination of the level of the voltage is not impaired or is negligibly impaired.

According to the invention, depending on the configuration, a measurement impedance ZM may also be connected between the network-side connection points APLG, APNG of the mechanical isolating contact unit MK. The measurement impedance ZM may be, for example, an electrical resistor or/and capacitor. The measurement impedance may also be an inductor. In particular, the measurement impedance may be a series circuit or parallel circuit of a resistor or/and a capacitor or/and an inductor.

A second voltage sensor unit SU2 may be advantageously provided and determines the level of the voltage between the network-side neutral conductor connection NG and the network-side phase conductor connection LG.

The first voltage sensor unit can also be replaced by using two voltage measurements (upstream of the electronic interruption unit and downstream of the electronic interruption unit). The voltage across the electronic interruption unit is determined by forming a difference.

A/the second voltage sensor unit SU2 which is connected to the control unit SE may thus be provided and determines the level of a second voltage between the network-side neutral conductor connection NG and the network-side phase conductor connection LG. Furthermore, a third voltage sensor unit SU3 which is connected to the control unit may be provided and determines the level of a third voltage between the network-side neutral conductor connection NG and the load-side connecting point EUL of the electronic interruption unit EU. The circuit breaker device is configured in such a manner that the level of a/the first voltage between the network-side connecting point EUG and the load-side connecting point EUL of the electronic interruption unit EU is determined from the difference between the second and third voltages.

In the example according to FIG. 1, the electronic interruption unit EU has a single-pole design, in the phase conductor in the example. In this case, the network-side connection point APNG for the neutral conductor of the mechanical isolating contact unit MK is connected to the network-side neutral conductor connection NG of the housing GEH.

The circuit breaker device SG is advantageously configured in such a manner that the contacts of the mechanical isolating contact unit MK can be opened, but not closed, by the control unit SE, which is indicated by an arrow from the control unit SE to the mechanical isolating contact unit MK.

The mechanical isolating contact unit MK can be operated by means of a mechanical handle HH on the circuit breaker device SG in order to switch manual opening or closing of the contacts KKL, KKN. The manual handle HH indicates the switching state (open or closed) of the contacts of the mechanical isolating contact unit MK. Furthermore, the contact position (or the position of the handle), that is to say the switching state, can be transmitted to the control unit SE. For this purpose, it is possible to provide, for example, a position sensor which senses the position and emits a corresponding position signal.

The mechanical isolating contact unit MK is advantageously configured in such a manner that (manual) closing of the contacts by means of the mechanical handle is possible only after an enable (enable), in particular an enable signal. This is likewise indicated by the arrow from the control unit SE to the mechanical isolating contact unit MK. That is to say, the contacts KKL, KKN of the mechanical isolating contact unit MK may be closed by means of the handle HH only when the enable or the enable signal (from the control unit SE) is present. Without the enable or the enable signal, the handle HH can be actuated, but the contacts cannot be closed ("permanent slider contacts").

The circuit breaker device SG has an energy supply NT, for example a power supply unit. In particular, the energy supply NT is provided for the control unit SE, which is indicated by a link between the energy supply NT and the control unit SE in FIG. 1. The energy supply NT is connected (on the other hand) to the network-side neutral conductor connection NG and the network-side phase conductor connection LG. A fuse 9 SS, in particular a safety fuse, may be advantageously provided in the link to the network-side neutral conductor connection NG (or/and phase conductor connection LG).

Alternatively, the measurement impedance ZM may be connected to the network-side neutral conductor connection NG via the fuse SS. This advantageously makes it possible to implement a three-pole electronic unit EE (FIG. 11), for example in the form of a module, which has three connection points, one neutral conductor connection point and two phase conductor connection points. The electronic unit EE has, for example, the electronic interruption unit EU, the control unit SE, the energy supply NT (in particular including the fuse SS), the current sensor unit SI, the first voltage sensor unit SU1 and optionally the second voltage sensor unit SU2.

The low-voltage circuit may be a three-phase AC circuit having one neutral conductor and three phase conductors. For this purpose, the circuit breaker device may be configured as a three-phase variant and may have, for example, further network-side and load-side phase conductor connections. In a similar manner, a series circuit of an electronic interruption unit together with a contact of the mechanical isolating contact unit is respectively provided between the further network-side and load-side phase conductor connections. A voltage determination means, in particular first voltage sensor units, is also provided.

The measurement impedance ZM should have a very high value (resistance or impedance value) in order to keep the losses low. The level of the value of the measurement impedance should be such that the current through the measurement impedance is less than 1 mA when the network voltage is applied, with the result that the losses in the measurement impedance ZM are (negligibly) small. The (measurement) current is preferably less than 0.1 mA.

A value of 1 MOhm, for example, in the case of a resistance, for example. A value of 1 MOhm leads to losses of approximately 50 mW in a 230 V low-voltage circuit.

The measurement impedance should advantageously be greater than 100 kOhm, 500 kOhm, 1 MOhm, 2 MOhm, 3 MOhm, 4 MOhm, 5 MOhm or more.

High impedance is used to mean a state in which only a current of a negligible magnitude flows. In particular, high impedance is used to mean resistance values of greater than 1 kilohm, preferably greater than 10 kilohms, 100 kilohms, 1 megaohm, 10 megaohms, 100 megaohms, 1 gigaohm or greater.

Low impedance is used to mean a state in which the current value indicated on the circuit breaker device could flow.

In particular, low impedance is used to mean resistance values of less than 10 ohms, preferably less than 1 ohm, 100 milliohms, 10 milliohms, 1 milliohm or less.

Figure 2:
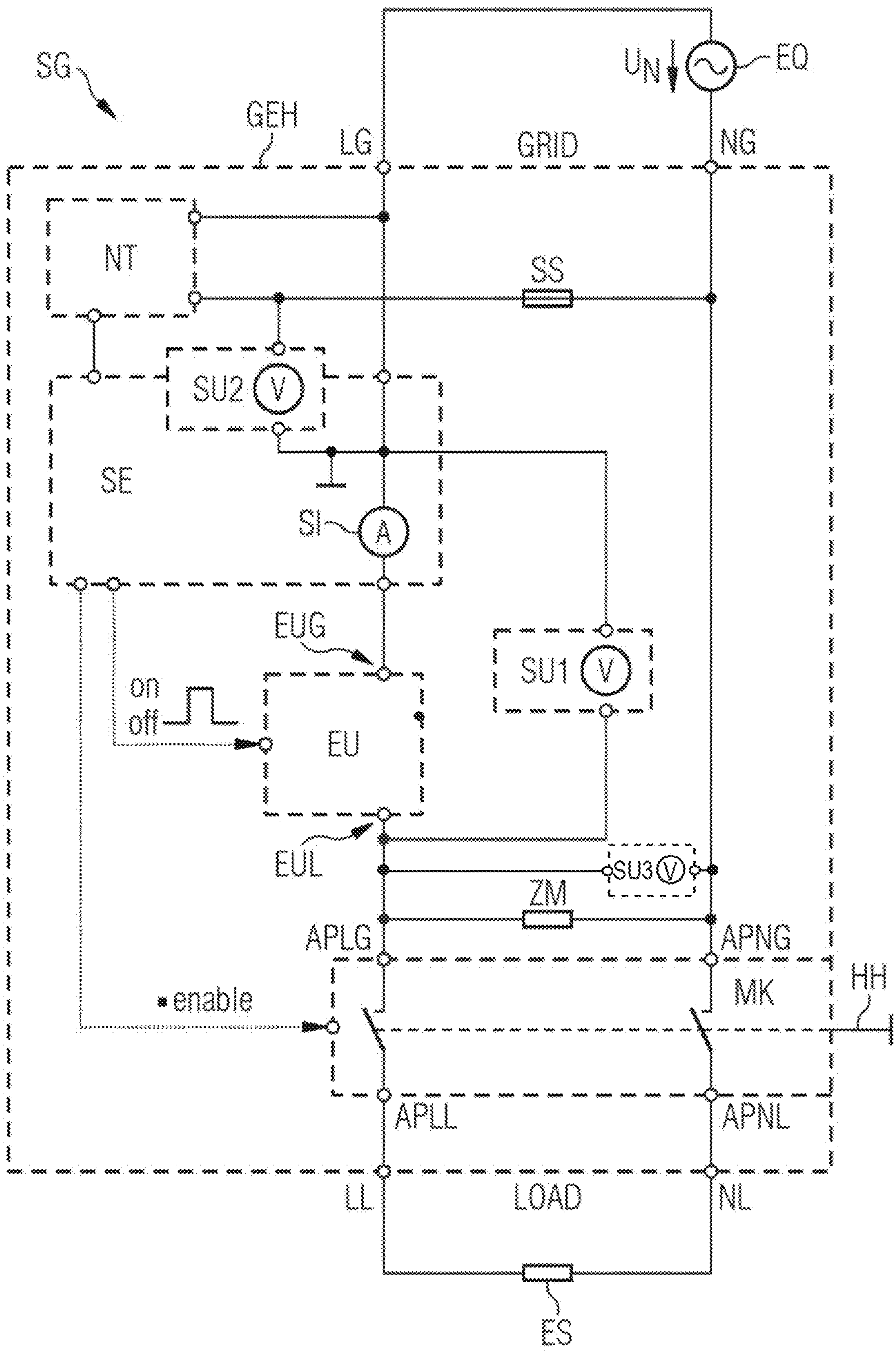
FIG. 2 shows a second illustration of a circuit breaker device.

FIG. 2 shows a representation according to FIG. 1, with the difference that an energy source EQ with a nominal voltage $U_N$ of the low-voltage circuit is connected to the network side GRID. A consumer or energy sink ES is also connected to the load side LOAD.

Furthermore, an enable signal enable is depicted for the link from the control unit SE to the mechanical isolating contact unit MK.

The mechanical isolating contact unit MK is illustrated in an open state OFF, that is to say with open contacts KKN, KKL in order to avoid a current flow.

The circuit breaker device SG operates, in principle, for example, in such a manner that, when the contacts of the mechanical isolating contact unit are closed and the interruption unit has a low impedance and

- when a current that exceeds a first current value is determined, in particular the first current value is exceeded for a first time limit, the electronic interruption unit EU comes to have a high impedance and the mechanical isolating contact unit MK remains closed,
- when a current that exceeds a higher second current value, in particular for a second time limit, is determined, the electronic interruption unit EU comes to have a high impedance and the mechanical isolating contact unit MK is opened,
- when a current that exceeds an even higher third current value is determined, the electronic interruption unit comes to have a high impedance and the mechanical isolating contact unit MK is opened.

Figure 3:
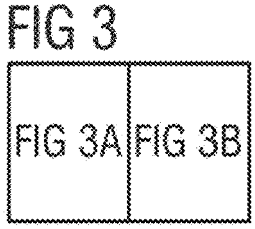
FIG. 3 shows a third illustration of a circuit breaker device with first voltage profiles.
Figure 3A:
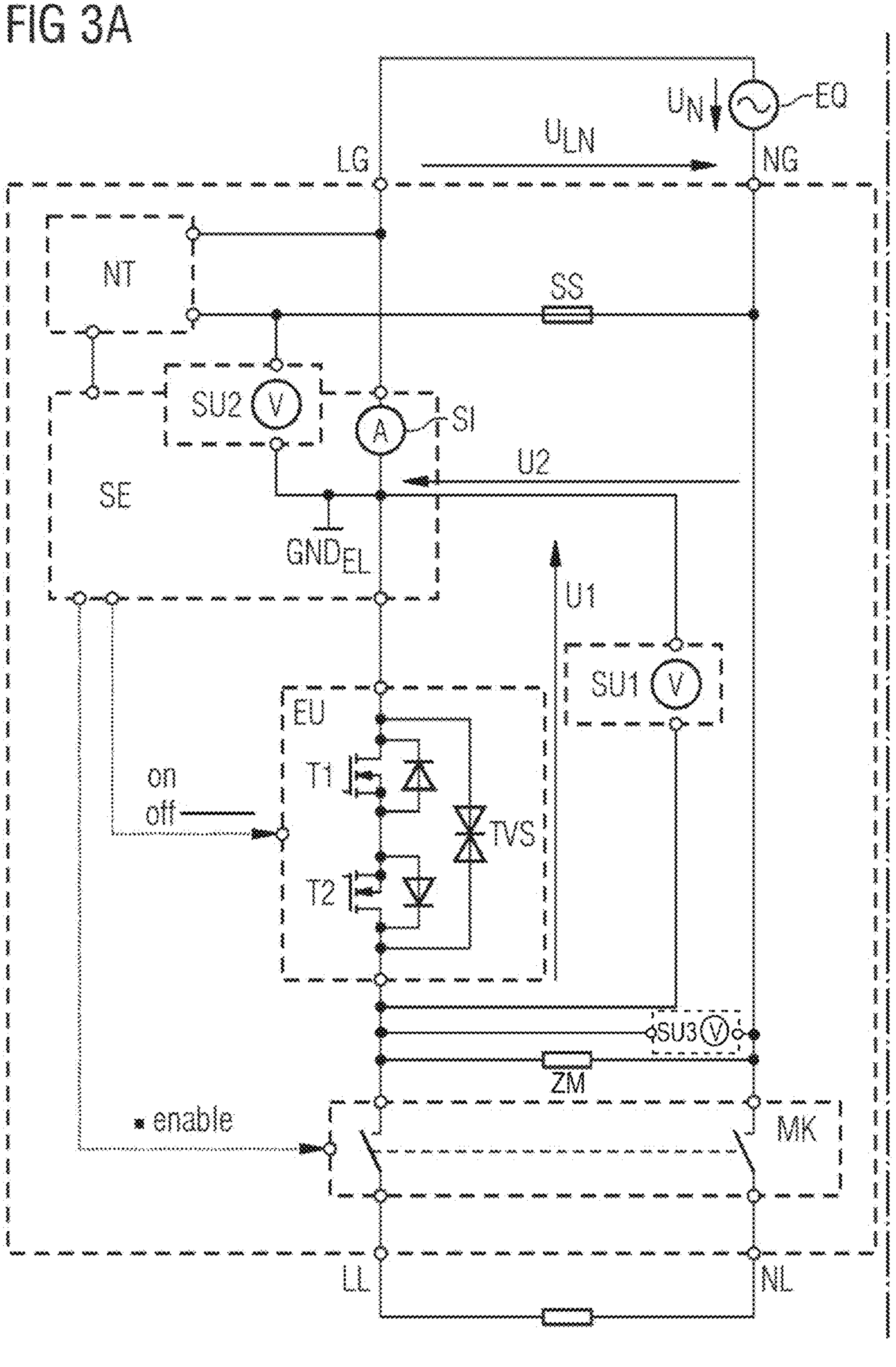
Figure 3B:
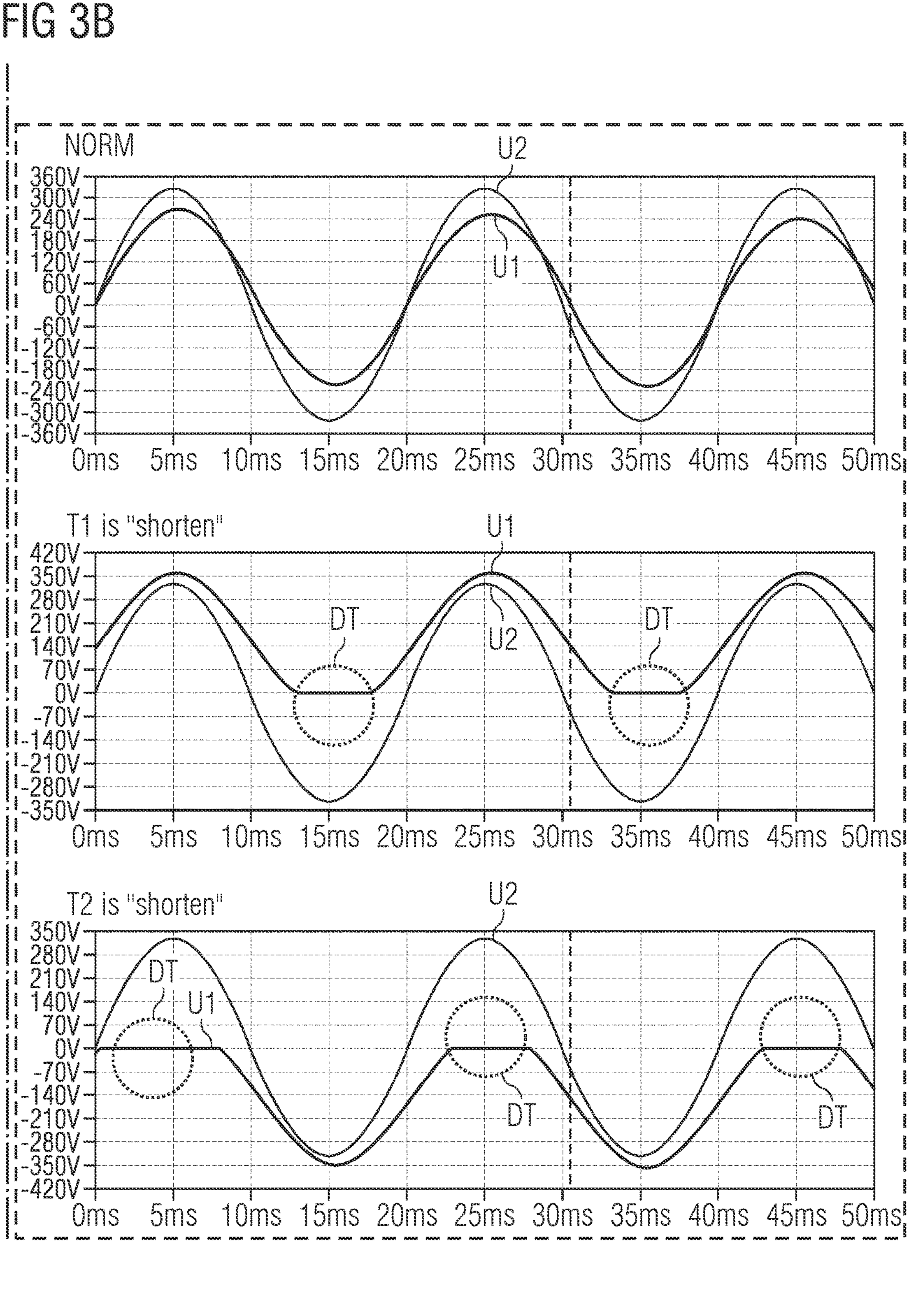

FIG. 3 shows an illustration according to FIG. 2, with various differences. The voltages at and in the circuit breaker device are illustrated in more detail:

- the nominal voltage $U_N$ of the energy source EQ of the low-voltage circuit,
- the network voltage $U_{IN}$ applied between the network-side neutral conductor connection NG and the network-side phase conductor connection LG,
- the second voltage U2 or $U_{N,GND}$ measured in the circuit breaker device by the second voltage sensor unit SU2,
- the first voltage U1 or $U_{SW}$ measured across the electronic interruption unit EU using the first voltage sensor unit SU1.

In this variant according to FIG. 3, the first voltage U1 (or $U_{SW}$) is measured directly across the electronic interruption unit (that is to say without a current sensor unit SI). The second voltage U2 (or $U_{N,GND}$) corresponds to the network voltage $U_{IN}$ minus the (minimum) voltage drop across the current sensor unit SI and the resistive losses.

A detail of the electronic interruption unit EU is also illustrated, wherein the (single-pole) electronic interruption unit EU has semiconductor-based switching elements T1, T2. In the example according to FIG. 3, two semiconductor-based switching elements T1, T2 connected in series are provided. An overvoltage protection device TVS is advantageously provided across the series circuit of the two semiconductor-based switching elements T1, T2.

In the configuration according to FIG. 3, two unidirectional electronic switching elements are connected in series (in antiseries). The first unidirectional switching element is arranged in this case such that it can be switched in a first current direction and the second unidirectional switching element is arranged such that it can be switched 27 in the opposite current direction, wherein the unidirectional switching elements are conductive counter to their current switching direction (directly or indirectly, for example by means of internal or external diodes connected in parallel). In particular, the circuit breaker device is configured in such a manner that the first and second switching elements can be switched independently of one another.

The following situation is considered below:

- nominal voltage or network voltage (for example 230 V AC) is applied to the network-side connection LG, NG or network side GRID or network connection of the circuit breaker device, a consumer or an energy sink ES or a load is connected to the load side LOAD of the circuit breaker device.

In the first step, the check in the OFF state of the electronic protective device is intended to be considered.

For this purpose:

the mechanical isolating contact unit is open (contacts open)

the electronic interruption unit is switched off (semiconductor-based switching elements have a high impedance)

the control unit (including the controller unit) is active.

The electrical potential between the electronic interruption unit and the mechanical isolating contact unit is defined by the measurement impedance ZM and the impedance of the electronic interruption unit in the switched-off state (voltage divider).

The control unit can now switch on the semiconductor-based switching elements (which of the two semiconductors is active?) at any time (and therefore for a specific voltage division (depending on the instantaneous value of the voltage, the half-wave of the voltage)). The switching elements of the electronic interruption unit EU can hereby be tested by taking into account the polarity of the AC voltage.

The electronic interruption unit EU (or the electronic switch) is therefore switched on for a very short time (in the milliseconds range), for example. If the electronic interruption unit is functional, this can be determined by means of the (simultaneous) voltage measurement (for example first voltage sensor unit, second voltage sensor unit) and (subsequent) evaluation. For example, it is possible to determine, in the case of a defective semiconductor-based switching element, whether it always remains switched on (fault pattern: "broken down") or always remains switched off (fault pattern: "blown").

Two typical and common fault patterns are therefore covered.

If the check is fault-free, an enable to switch on the circuit breaker device, specifically the electronic interruption unit or the mechanical isolating contact unit, can be effected.

If the check is not fault-free, no enable to switch on the circuit breaker device will be effected, with the result that the outgoing circuit cannot be switched on and a dangerous state is therefore prevented.

The circuit breaker device is configured in such a manner that, when the contacts of the mechanical isolating contact unit MK are open and the electronic interruption unit EU has been switched to high impedance, the level of the voltage across the electronic interruption unit, that is to say the first voltage U1, is determined. There is a first fault condition if a first voltage threshold value is undershot, with the result that the electronic interruption unit is prevented from coming to have a low impedance or/and closing of the contacts is prevented. With regard to the mechanical isolating contact unit MK, an enable signal enable is not emitted from the control unit SE to the mechanical isolating contact unit MK, for example.

Three corresponding voltage profiles over time are illustrated on the right-hand side of FIG. 3. The level of the voltage in volts is plotted on the vertical y axis and the time in milliseconds (ms) is plotted on the horizontal x axis. The profile of the level of the first voltage U1 and the profile of the level of the second voltage U2 over time are illustrated in each case.

The first, upper graph NORM illustrates the voltage profiles for a fault-free state of the electronic interruption unit EU. The difference in the amplitude between the first voltage U1 and the second voltage U2 is caused in this case by the voltage drop across the measurement impedance ZM. The first voltage threshold value should be guided by the magnitude of the measurement impedance. The first voltage threshold value should be, for example, somewhat smaller than the nominal voltage minus the voltage drop across the measurement impedance. If the first voltage U1 is greater than the first voltage threshold value, there is a fault-free electronic interruption unit EU. The evaluation can take place on the basis of the instantaneous values of the voltage and the root-mean-square values of the voltage. If the first voltage U1 is greater than the first voltage threshold value, there is consequently a first enable condition, as a result of which the electronic interruption unit can come to have a low impedance or/and closing of the contacts of the mechanical isolating contact unit is enabled. This is illustrated in FIG. 3 by means of an arrow, with the label enable, from the control unit SE to the mechanical isolating contact unit MK, for enabling the closing of the contacts of the mechanical isolating contact unit MK by means of the handle HH. The link or the arrow from the control unit SE to the electronic interruption unit EU has a representation of a profile of the switching state of the electronic interruption unit over time, in which a switched-off/high-impedance state is indicated with off and a switched-on/low-impedance state of the electronic interruption unit EU is indicated with on. In the example, the electronic interruption unit EU is in the switched-off state off, which is illustrated by a straight line beside "off".

The second, middle graph, "T1 is "shorten"", illustrates the voltage profile for a defective electronic interruption unit EU, in which in the example a semiconductor-based switching element, the switching element T1 in the example, is constantly conductive (broken down/short-circuited). As a result, a current flows through the electronic interruption unit in a half-wave of the electrical voltage even though the electronic interruption unit actually has (should have) a high impedance. The conductivity in the current direction affected by the affected semiconductor-based switching element prevents a voltage from building up across the affected semiconductor-based switching element. That is to say, the level of the first voltage U1 cannot exceed the first voltage threshold value, which can be determined using the first voltage sensor unit SU1 in conjunction with the control unit SE. This is indicated by the abbreviation DI in FIG. 3.

The third, lower graph, "T2 is "shorten"", illustrates the voltage profile for a defective electronic interruption unit EU, in which the other semiconductor-based switching element, the switching element T2 in the example, is constantly conductive (broken down/short-circuited). The statements made with respect to the middle graph similarly apply.

The second and third graphs illustrate a fault state of the electronic interruption unit EU which can be found, according to the invention, when the contacts of the mechanical isolating contact unit are closed and the interruption unit has a low impedance, before the contacts of the mechanical isolating contact unit are closed and prevents manual closing of the contacts of the mechanical isolating contact unit.

This is explained again in other words. FIG. 3 shows an overview of the circuit diagram and voltage profiles for the situation in which a switching element in the electronic interruption unit is defective, is broken down/short-circuited in this case. Since unidirectionally blocking power semiconductors are typically used, the functionality of the semiconductor-based switching element T1 or T2 can be checked depending on the applied voltage polarity. If an AC voltage is applied to the connections of a functional circuit breaker device, a voltage U1 or $U_{SW}$ is produced across the electronic interruption unit and can be determined using a corresponding first voltage sensor unit SU1. This is illustrated in the upper graph NORM. If one of the two switching elements has broken down, the voltage can no longer be taken up by the electronic interruption unit. The measured voltage becomes zero here for a certain period of time (approximately 5 ms). This is illustrated in the two profiles "T1 is "shorten"" and "T2 is "shorten"". This makes it possible to measure or detect a defective switching element. If both switching elements have broken down, the first voltage U1 or $U_{SW}$ is always zero (not illustrated).

Figure 4:
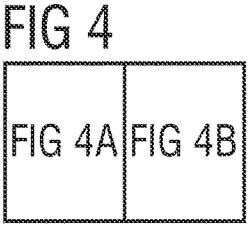
FIG. 4 shows a fourth illustration of a circuit breaker device with second voltage profiles.
Figure 4A:
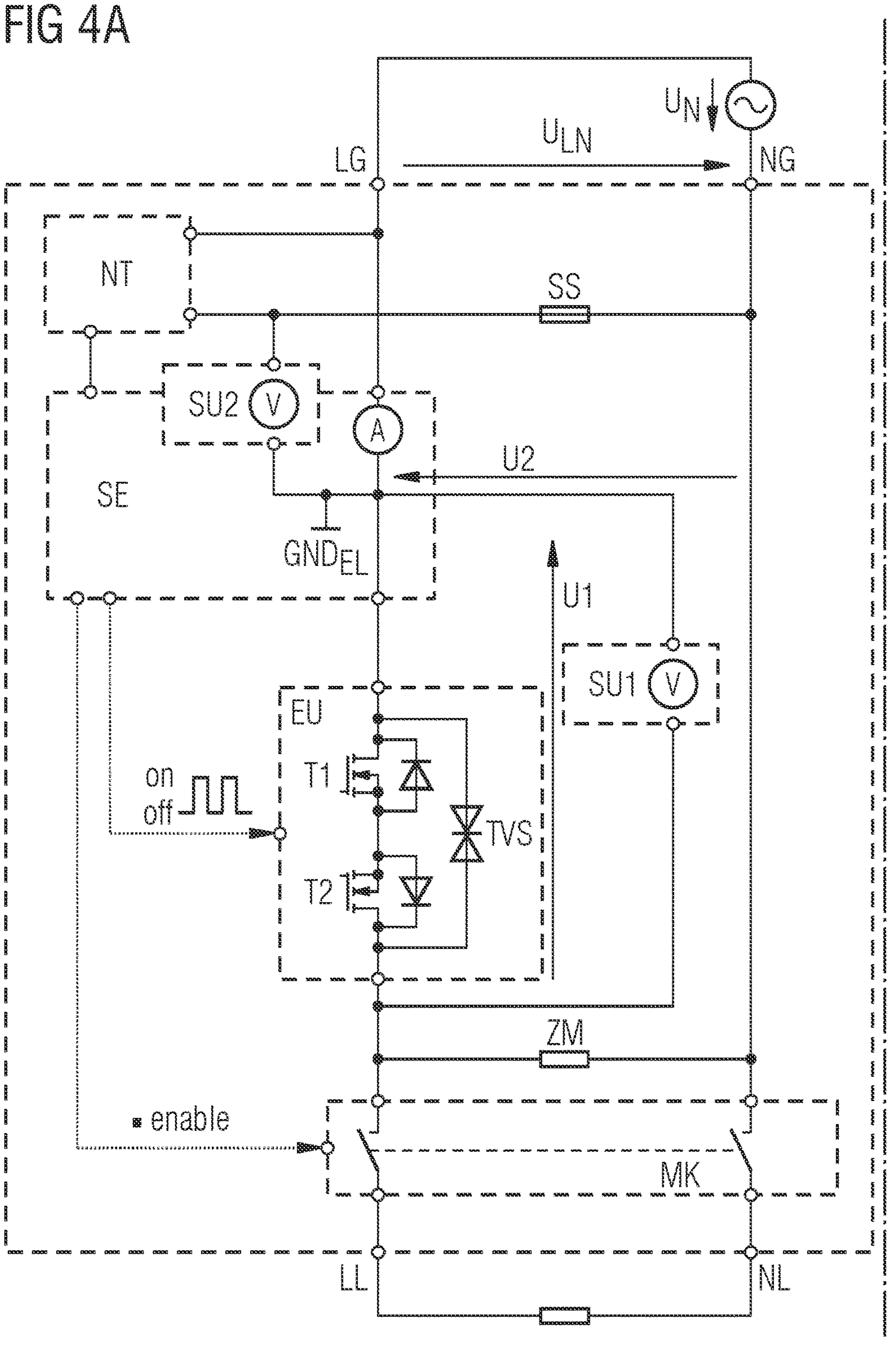
Figure 4B:
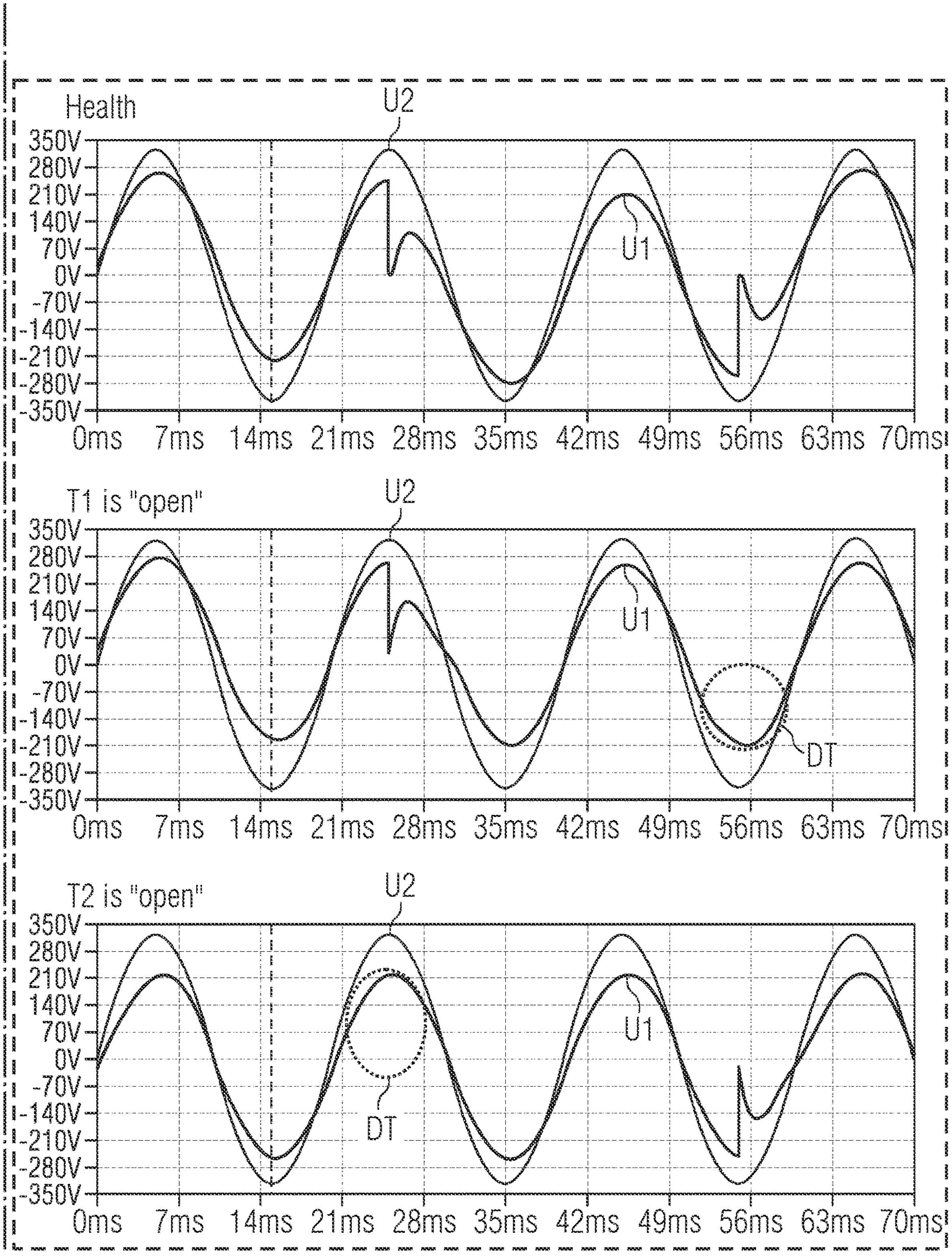

FIG. 4 shows an illustration according to FIG. 3, with the difference that the electronic interruption unit EU is briefly switched on and off. This is indicated by a square-wave signal for the states off and on on the link between the control unit SE and the electronic interruption unit EU.

Three graphs according to FIG. 3 are again illustrated on the right-hand side of FIG. 4. Voltage profiles are shown for the situation in which a switching element in the electronic interruption unit is defective, is blown/open in this case. Since unidirectionally blocking power semiconductors are typically used, the functionality of the switching element T1 or T2 can be checked depending on the applied voltage polarity.

If an AC voltage is applied to the functional circuit breaker device on the network side, a voltage U1 or $U_{SW}$ is produced across the electronic interruption unit and can be measured using a corresponding voltage measurement (first voltage sensor unit SU1). This is illustrated in the upper profiles "Health".

In order to check whether one of the two semiconductor-based switching elements has blown, a short switch-on pulse, a first period of time, is given. If one of the two included switching elements has blown, the switching element can no longer be switched on by the electronic interruption unit. The measured voltage then always remains like in the switched-off state even during a switch-on process. This is illustrated in the middle graph, "T1 is "open"", and the lower graph, "T2 is "open"". This makes it possible to measure or detect a defective switching element.

That is to say, the circuit breaker device is configured in such a manner that, when the contacts of the mechanical isolating contact unit MK are open and the electronic interruption unit EU has been switched to high impedance, the electronic interruption unit EU is switched to a low-impedance state for a first period of time and the level of the voltage across the electronic interruption unit is determined.

There is a second fault condition if a second voltage threshold value is exceeded, with the result that the electronic interruption unit is prevented from coming to have a low impedance or/and closing of the contacts is prevented. The circuit breaker device is advantageously configured in such a manner that, when there is a fault condition, closing of the contacts of the mechanical isolating contact unit MK is prevented. In particular, no enable signal (enable) is emitted to the mechanical isolating contact unit MK.

Figure 5:
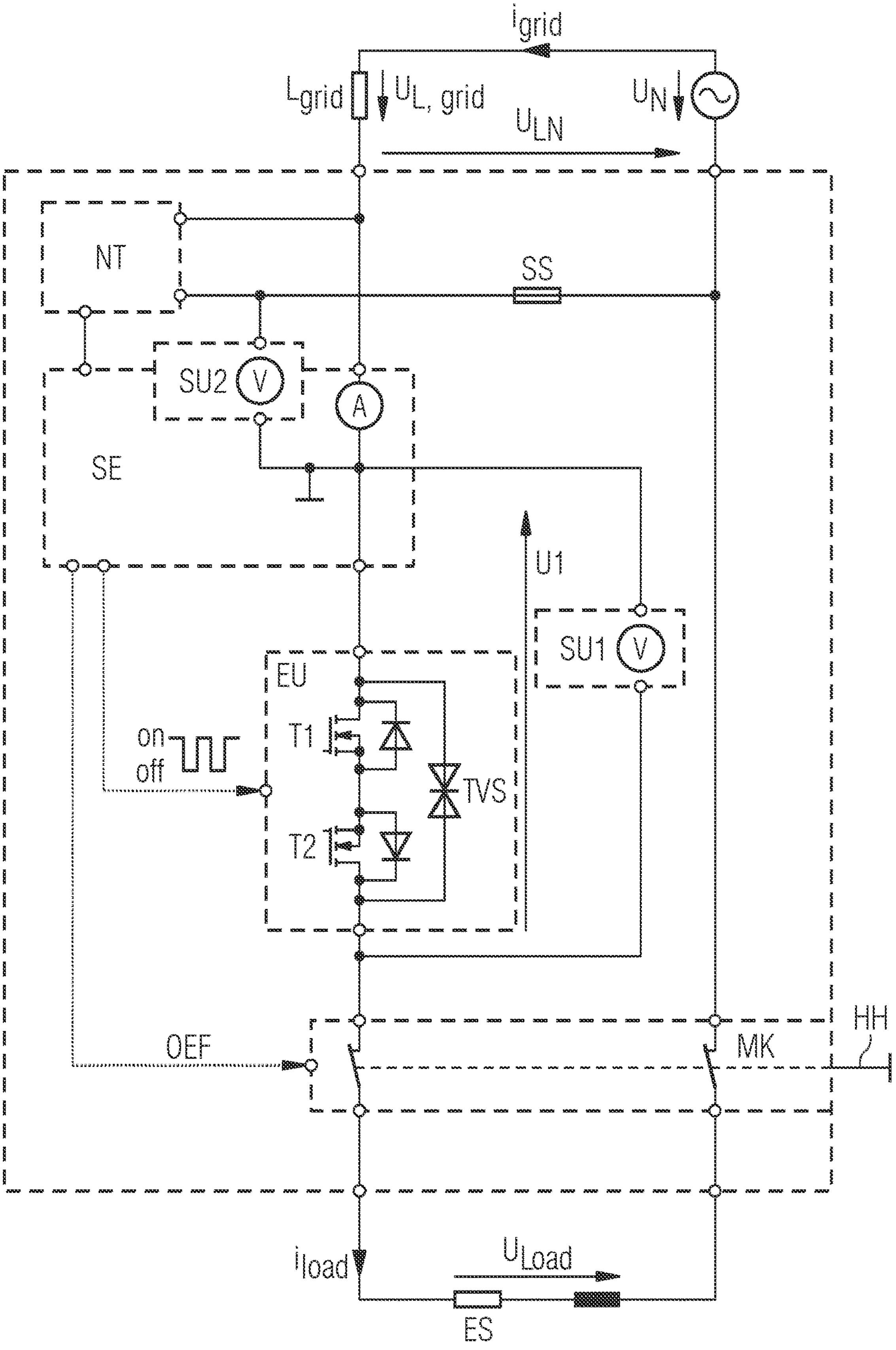
FIG. 5 shows a fifth illustration of a circuit breaker device.

FIG. 5 shows an arrangement according to FIG. 3 and FIG. 4, with the difference that the contacts of the mechanical isolating contact unit are closed and the electronic interruption unit has a low impedance.

The circuit breaker device is configured in such a manner that, when the contacts of the mechanical isolating contact unit MK are closed and the electronic interruption unit EU has been switched to low impedance, the level of the voltage across the electronic interruption unit is determined. If a fifth voltage threshold value is exceeded, there is a fourth fault condition which initiates the electronic interruption unit coming to have a high impedance or/and initiates opening of the contacts.

Furthermore, the circuit breaker device is configured in such a manner that, when the contacts of the mechanical isolating contact unit MK are closed and the electronic interruption unit EU has been switched to low impedance, the electronic interruption unit EU is switched to a high-impedance state for a third period of time and the level of the voltage across the electronic interruption unit is determined. If a sixth voltage threshold value is undershot, there is a fifth fault condition which initiates the electronic interruption unit coming to have a high impedance or/and initiates opening of the contacts.

This is indicated in FIG. 5 by virtue of the link between the control unit SE and the electronic interruption unit EU having a square-wave signal which is in the state on (low impedance) and is briefly switched to the state off (high impedance).

If the fifth or sixth fault condition is present, an opening signal OEF is sent from the control unit SE to the mechanical isolating contact unit MK in order to initiate opening of the contacts, as indicated in FIG. 5. The control unit SE may also send a signal (not depicted) for coming to have a high impedance to the electronic interruption unit. The mechanical contacts are preferably opened shortly before the current zero crossing, with the result that the mechanical switching contacts can interrupt the current flow more easily.

The electronic interruption unit is advantageously switched to a high-impedance state when the instantaneous value of the voltage between the network-side neutral conductor connection and the network-side phase conductor connection exceeds a seventh voltage threshold value, in particular when the instantaneous value of the voltage is at a maximum.

FIG. 5 also depicts a network-side line inductor $L_{grid}$ with an associated voltage drop $U_{Lgrid}$ and a network-side current $i_{grid}$. The load-side current $i_{load}$ is also depicted in addition to the load-side voltage drop $U_{Load}$ across the consumer or energy sink ES. The energy sink ES is illustrated with its inductive and resistive components.

Figure 6:
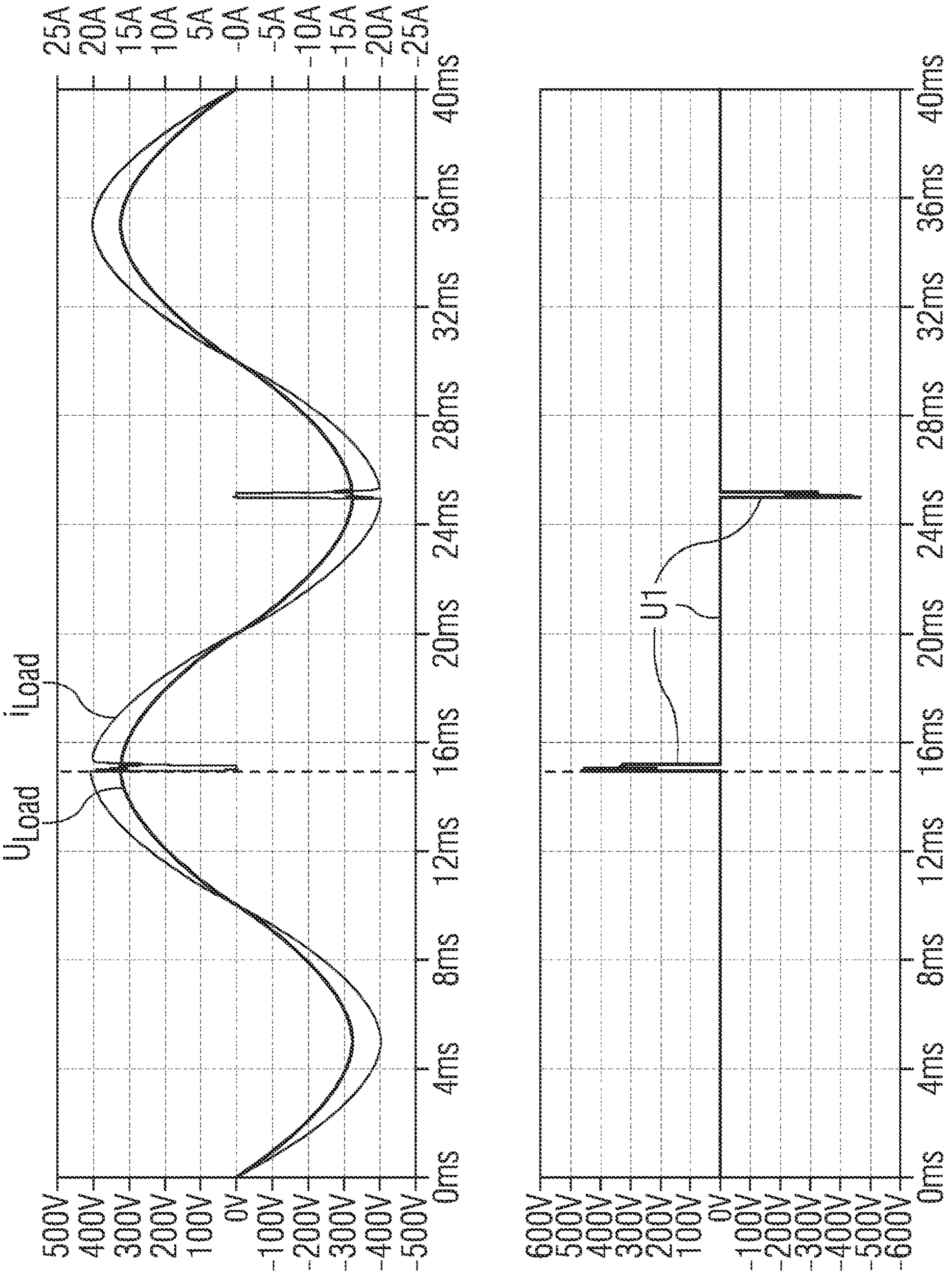
FIG. 6 shows a third illustration of voltage profiles.

FIG. 6 shows graphs with voltage profiles according to FIG. 3 and FIG. 4, for the situation from FIG. 5, with the difference that current profiles (current over time) are also depicted. FIG. 5 shows voltage and current profiles during testing by briefly switching off the electronic interruption unit for a functional circuit breaker device. The upper graph from FIG. 6 illustrates the load-side voltage $U_{Load}$ and the load-side current $i_{load}$. Brief voltage and current dips at the time when the electronic interruption unit comes to have a high impedance—for a third period of time—can be seen. In the example, when the voltage or the current is at a maximum, that is to say when the instantaneous value of the voltage or current is at a maximum.

If the first voltage U1 across the semiconductor-based switching element is positive, the switching element T2, for example, can be checked. If the first voltage U1 across the semiconductor-based switching element is negative, the switching element T1, for example, can be checked.

Figure 7A:
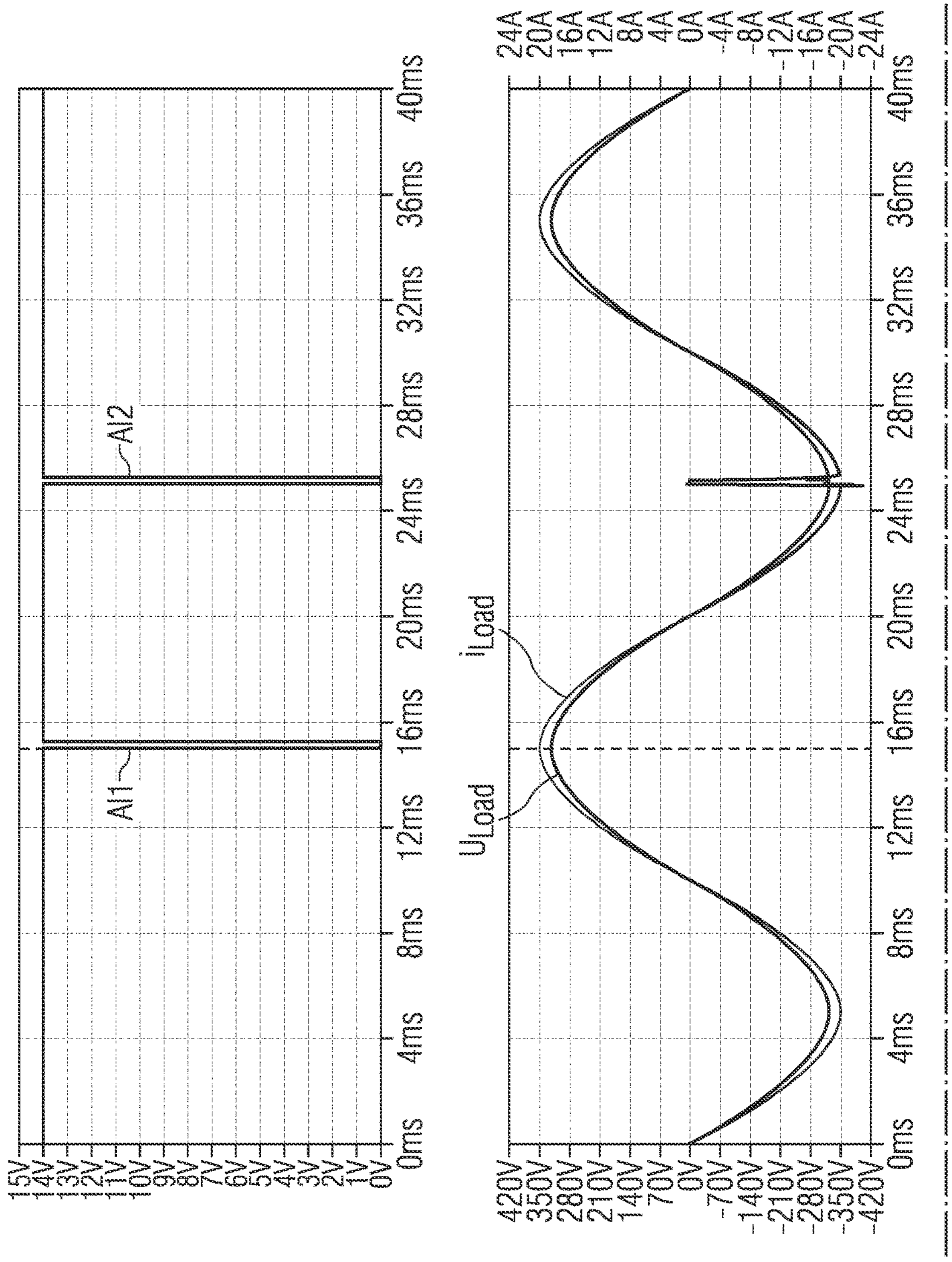
FIG. 7 shows a fourth illustration of voltage profiles.
Figure 7:
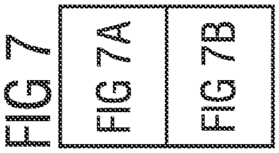
Figure 7B:
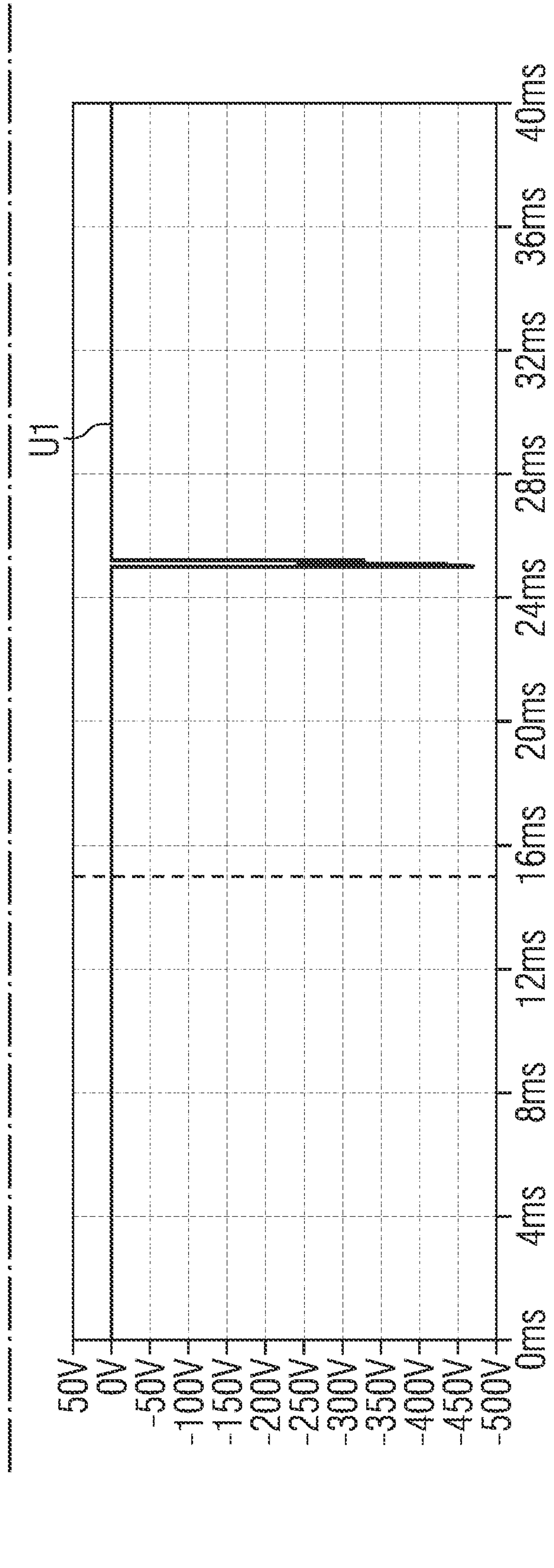

FIG. 7 shows voltage and current profiles according to the preceding FIGS. 3, 4 and 6. The upper graph from FIG. 7 depicts a first switch-off pulse AI1 at the time t=16 ms and a second switch-off pulse AI2 for the semiconductor-based switching elements at the time t=25 ms.

The middle graph illustrates the load-side voltage $U_{Load}$ and the load-side current $i_{load}$. During the first switch-off pulse AI1, no load-side voltage dip and no load-side current dip either can be detected. During the second switch-off pulse AI2, there is a brief load-side voltage dip and current dip.

The lower graph depicts the profile of the first voltage U1. A voltage peak of the first voltage U1 can be seen at the time of the second switch-off pulse AI2.

FIG. 7 shows the voltage profiles during testing by briefly switching off the switching elements in the case of a defective circuit breaker device. It can be seen that no switching-off takes place during the positive half-wave. This fault pattern occurs, for example, in the case of a broken-down switching element, with the result that a broken-down switching element, for example switching element T2, can be inferred from this.

If the first voltage U1 across the electronic switching element is positive, a switching element T2, for example, can be checked. If the first voltage U1 across the electronic switching element is negative, the other switching element T1, for example, can be checked.

Figure 8:
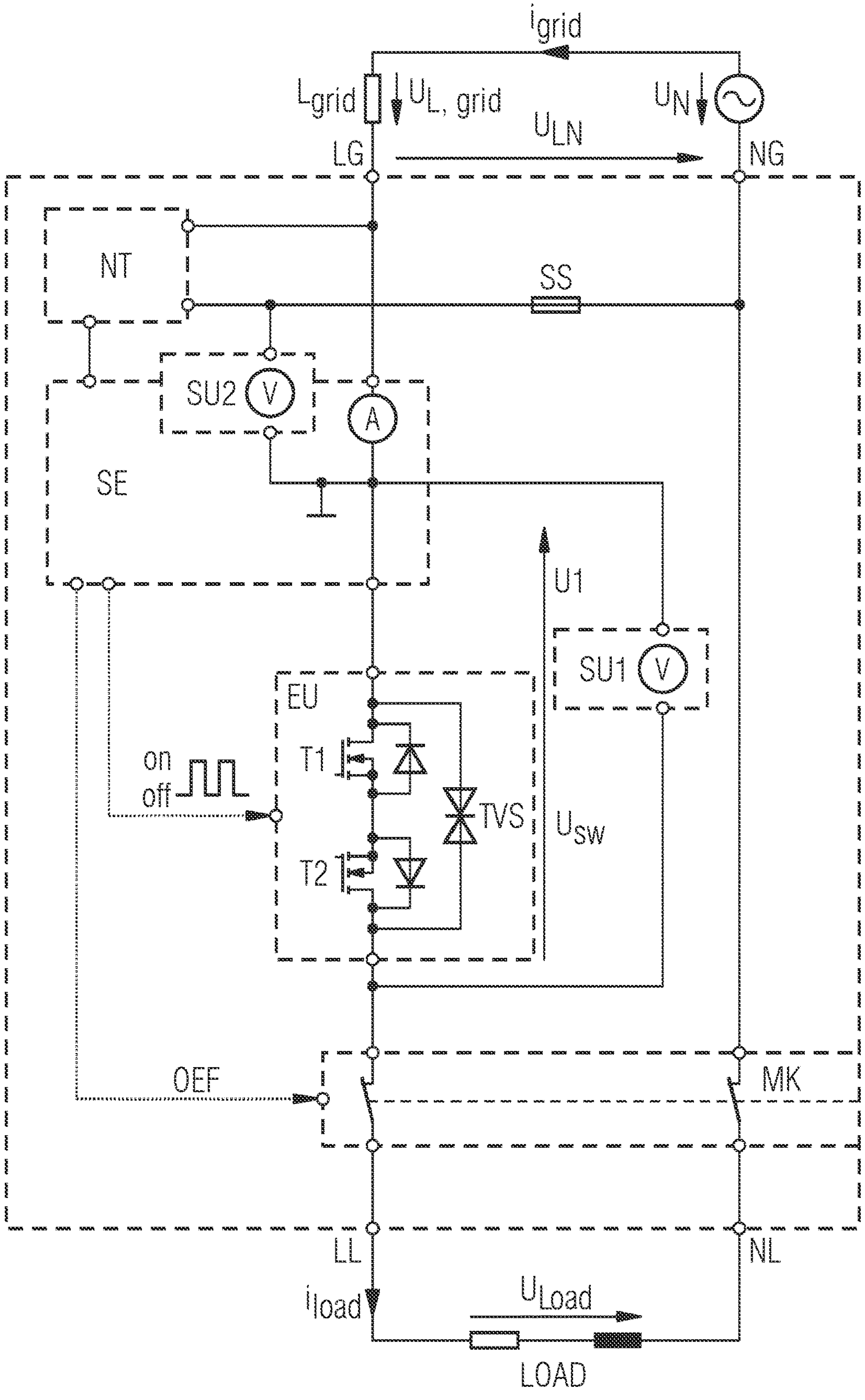
FIG. 8 shows a sixth illustration of a circuit breaker device.

FIG. 8 shows an arrangement according to FIGS. 1 to 5, with the difference that the contacts of the mechanical isolating contact unit are closed and the electronic interruption unit has a high impedance.

The circuit breaker device is configured in such a manner that, when the contacts of the mechanical isolating contact unit MK are closed and the electronic interruption unit EU has been switched to high impedance, the electronic interruption unit EU is switched to a low-impedance state for a second period of time and the level of the voltage across the electronic interruption unit is then determined. If a third voltage threshold value is exceeded, there is a third fault condition which prevents the electronic interruption unit from being switched to low impedance or/and initiates opening of the contacts.

This is indicated in FIG. 8 by virtue of the fact that the link between the control unit SE and the electronic interruption unit EU has a square-wave signal which is in the state off (off/high impedance) and is briefly switched to the state on (on/low impedance). That is to say, the electronic interruption unit EU is briefly (second period of time) switched to a low-impedance state.

If the third fault condition is present, an opening signal OEF is sent from the control unit SE to the mechanical isolating contact unit MK in order to initiate opening of the contacts, as indicated in FIG. 8. The mechanical contacts are preferably opened shortly before the current zero crossing, with the result that the mechanical switching contacts can interrupt the current flow more easily. Furthermore, the control unit SE can prevent or suppress a signal for the electronic interruption unit coming to have a low impedance.

The electronic interruption unit is advantageously switched to a low-impedance state when the instantaneous value of the voltage between the network-side neutral conductor connection and the network-side phase conductor connection undershoots a fourth voltage threshold value.

The switching-on time is advantageously selected, in the case of small voltage values (less than the fourth voltage threshold value), in order to minimize the resulting measurement current through the consumer/the energy sink/the load, and also to ensure personal protection. The fourth voltage threshold value may be, for example, (a maximum of) 50 V AC. That is to say, only safe (protective) extra-low voltages are used during switch-on.

FIG. 8 shows the basic overview of the checking of the electronic interruption unit in a so-called control or standby state. In this state, the mechanical isolating contact unit is closed and the electronic interruption unit has a high impedance. The functionality of the switching elements T1 or T2 can be checked by briefly switching on the electronic interruption unit or its semiconductor-based switching elements, depending on the applied voltage polarity.

Figure 9:
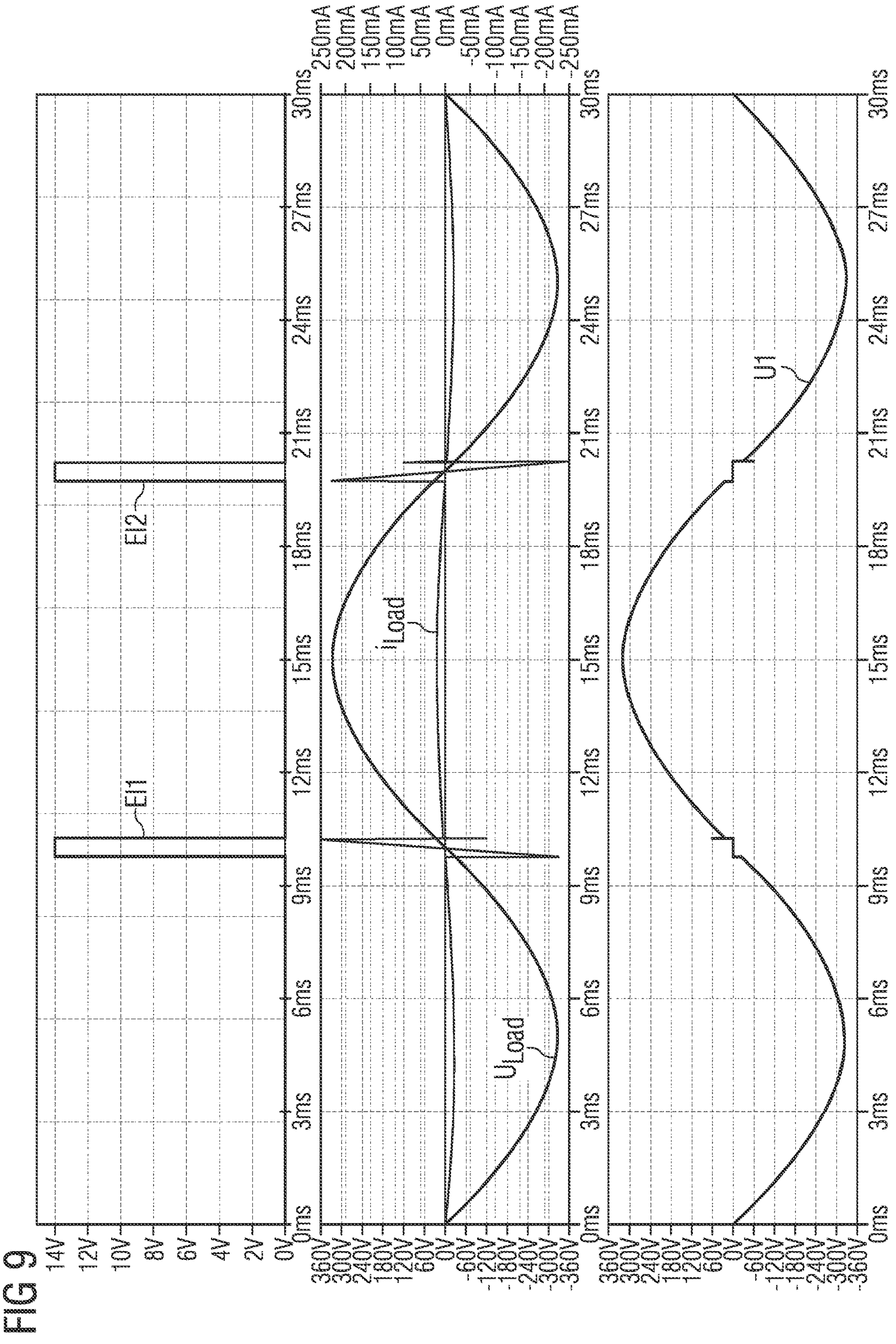
FIG. 9 shows a fifth illustration of voltage profiles.

FIG. 9 shows a representation according to FIG. 7, with the difference that the upper graph from FIG. 9 depicts a first switch-on pulse EI1 at the time t=10 ms and a second switch-on pulse EI2 for the semiconductor-based switching elements at the time t=20 ms.

The middle graph illustrates the load-side voltage profiles $U_{Load}$ and the load-side current profiles $i_{load}$.

A load-side current change or a current pulse can respectively be determined during the first switch-on pulse EI1 and during the second switch-on pulse EI2.

The lower graph depicts the profile of the first voltage U1. A voltage change or voltage dip of the first voltage U1 can be seen at the time of the first and second switch-on pulses 6 EI1, EI2 and can be detected (second voltage threshold value not exceeded). FIG. 9 shows this, by way of example, for a functional device.

The switching element T2, for example, can be checked in the positive half-wave. The switching element T1, for example, can be checked in the negative half-wave.

Figure 10:
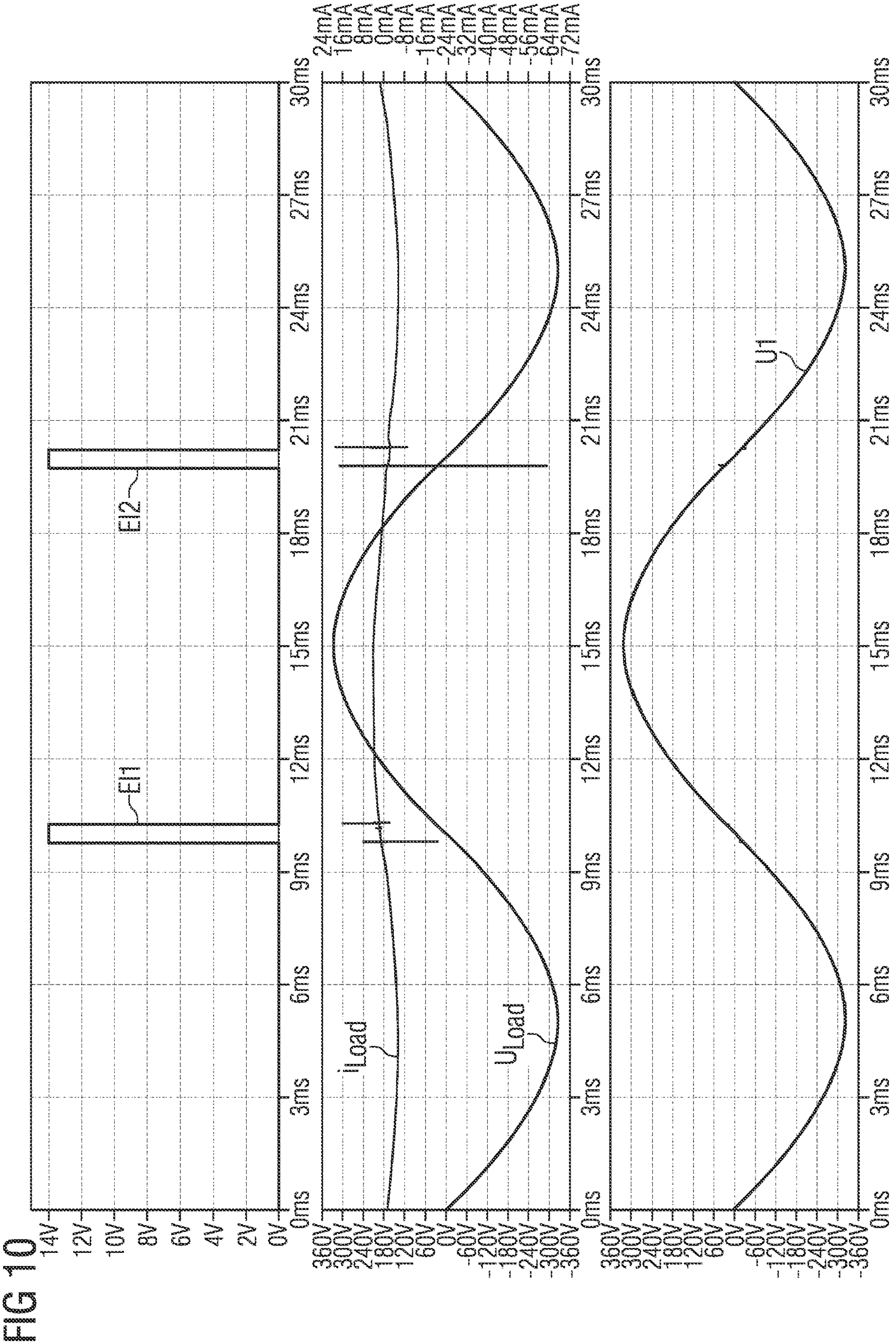
FIG. 10 shows a sixth illustration of voltage profiles.

FIG. 10 shows a representation according to FIG. 9, with the difference that exemplary current and voltage profiles are illustrated for a defective circuit breaker device with a defective electronic interruption unit, in which the semiconductor-based switching element T2 has blown.

In the middle graph, the current profile exhibits only asymmetrical excursions during switch-on, and no voltage dip can be detected in the lower graph for the first voltage. The third voltage threshold value has been exceeded. The third fault condition is present. Opening of the contacts of the mechanical isolating contact unit is initiated in order to establish safety in the low-voltage circuit.

Figure 11:
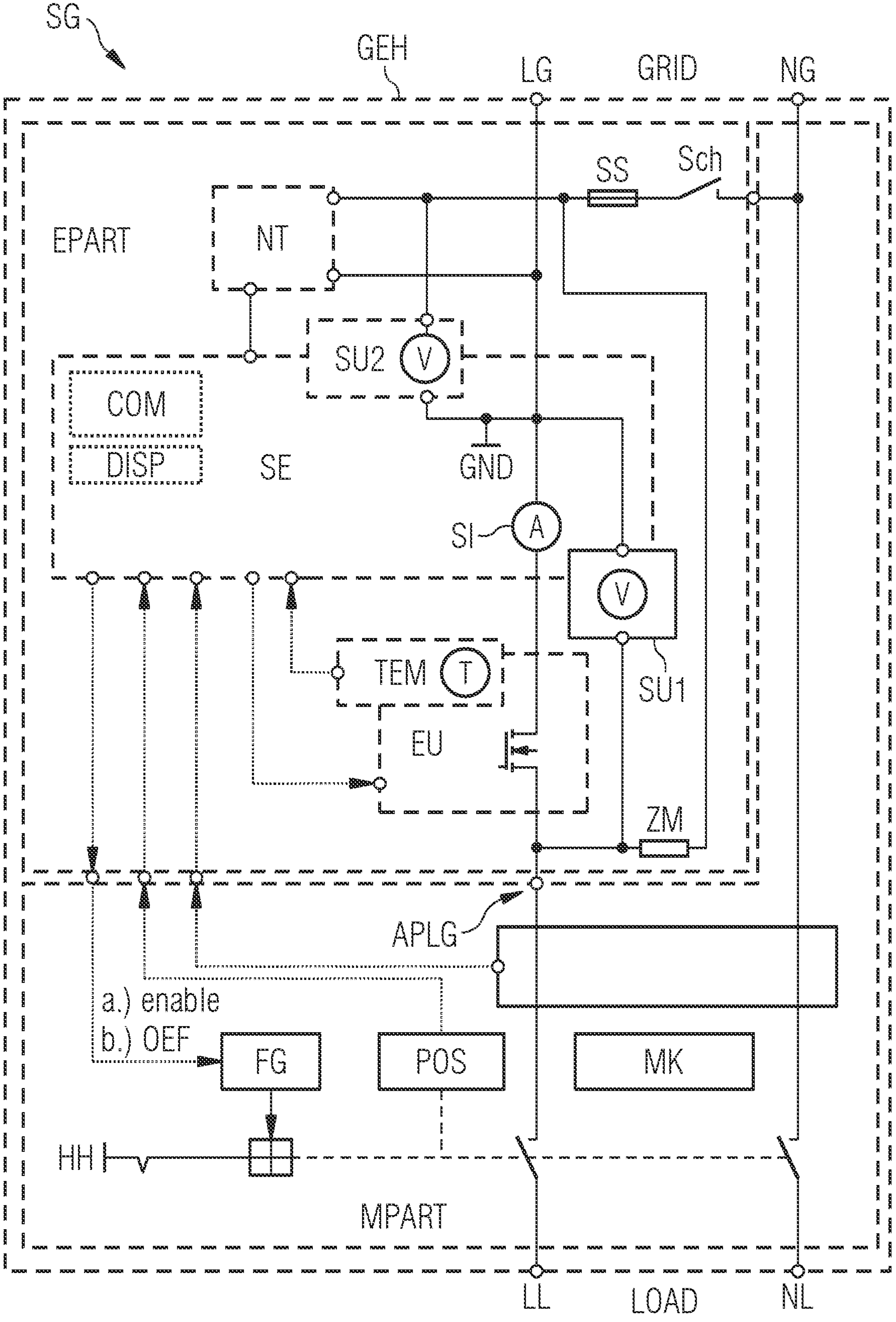
FIG. 11 shows a seventh illustration of a circuit breaker device.

FIG. 11 shows an illustration according to FIGS. 1-5 and FIG. 8, with the difference that the circuit breaker device has a two-part design. It contains an electronic first part EPART, for example on a printed circuit board.

The first part EPART may have the control unit SE, the first voltage sensor unit SU1, the second voltage sensor unit SU2, the current sensor unit SI, the electronic interruption unit EU and the energy supply NT. The first part may also have the safety fuse SS, a switch SCH, the measurement impedance ZM, a temperature sensor TEM (in particular for the electronic interruption unit EU), a communication unit COM, and a display unit DISP.

The first part EPART has only three connections:

- the network-side phase conductor connection LG,
- a connection for or to the network-side phase conductor connection point APLG of the mechanical isolating contact unit MK,
- a connection for a link to the network-side neutral conductor connection NG.

The circuit breaker device contains a second part MPART, in particular a mechanical second part. The second part MPART may have the mechanical isolating contact unit MK, the handle HH and an enabling unit FG. The second part may also have a position unit POS for reporting the position of the contacts of the mechanical isolating contact unit MK to the control unit and the (neutral conductor) link(s). Further units which are not described in any more detail may be provided.

A compact circuit breaker device according to the invention can be advantageously implemented by virtue of the two-part design.

The enabling unit FG enables the actuation of the contacts of the mechanical isolating contact unit by means of the handle HH if there is an enable signal enable. Furthermore, the enabling unit FG may cause the contacts to be opened if there is an opening signal OEF. The enabling unit then functionally acts as a tripping unit.

The invention shall be summarized and explained in more detail again below.

Proposed by way of example is an electronic circuit breaker device having:

- a housing with network-side and load-side connections
- a voltage sensor unit for measuring the network voltage
- a current sensor unit for measuring the (load) current
- a mechanical isolating contact unit including a handle (including an indication of the contact position, a release by means of the electronics, isolator properties)
- an electronic interruption unit having semiconductor-based switching elements
- a control unit
- the functionality of the electronic interruption unit is checked a) by continuously measuring the voltage across the electronic interruption unit; in this case, it is possible to detect, for example in the switched-on state, that a semiconductor-based switching element has blown;

b) by briefly (<10 ms, preferably <1 ms, generally: <20 ms, 50 ms, 100 ms, 200 ms, 500 ms or 1 s) switching the electronic interruption unit on and immediately off again; the period of time is dependent, for example, on whether the contacts are opened or closed, or switching the electronic interruption unit off and immediately on again, and simultaneously recording voltage measured values and/or current measured values and analyzing them such that a broken-down or blown electronic interruption unit is identified or broken-down or blown switching elements are identified.

Measurement is advantageously first of all carried out, then switching and measurement.

A first voltage sensor unit/voltage measurement unit across the electronic interruption unit is proposed in order to determine the voltage across the electronic interruption unit. Alternatively, a third voltage sensor unit may be provided in parallel with the second voltage sensor unit and is provided at the load-side connection of the electronic interruption unit, that is to say between the electronic interruption unit and the mechanical isolating contact unit, wherein the latter is connected, on the one hand, to the phase conductor and, on the other hand, to the neutral conductor. The first voltage can be determined by forming the 18 difference of the voltages between the second and third voltage sensor units. The first voltage sensor unit may be dispensed with in this case.

The invention proposes an additional measurement impedance which is fitted between the two conductors/current paths (phase conductor L and neutral conductor N) in order to define the electrical potential between the electronic interruption unit EU and the mechanical isolating contact unit for measurement purposes (no “floating” potential).

The invention proposes a computer program product or algorithm which switches the electronic interruption unit or the semiconductor-based switching elements on and off at suitable times (instantaneous values of the network voltage) and simultaneously evaluates the measured current and voltage values in order to identify whether or not the electronic interruption unit is functional.

The control unit SE may have a microcontroller (for this purpose). The computer program product can be executed on the microcontroller. The computer program product comprises instructions which, when the program is executed by the microcontroller, cause the latter to control the circuit breaker device to support, in particular carry out, the method according to the invention, in particular.

The computer program product can be stored on a computer-readable storage medium, such as a CD-ROM, a USB stick or the like.

There may also be a data carrier signal which transmits the computer program product.

The invention proposes a mechanical isolating contact unit which cannot be switched on as long as the control unit does not send an enable signal “enable”.

The electronic interruption unit can be automatically cyclically checked during “normal” on operation (for example automatic check once per hour).

If the semiconductor-based switching elements are checked in the switched-on state of the electronic interruption unit by briefly switching it off and are switched in a moment in which a current flows, this may result, together with the existing line inductance, in an overvoltage being produced at the electronic switch that makes it possible to test the existing energy absorber/overvoltage protection means TVS. A functioning overvoltage protection means limits the voltage to a certain range of values of the voltage.

The time for switching the semiconductor-based switching elements (for the check) depends on the polarity of the currently applied network voltage, with the result that individual switching elements can be specifically checked. Furthermore, the instantaneous value of the voltage can be taken into account when selecting the time.

In summary:

- voltage measurement across the electronic interruption unit or determination of the voltage drop across the electronic interruption unit EU (for example using a simple voltage divider),
- high-impedance measurement impedance (preferably R and/or C) for determining the electrical potential between the electronic interruption unit and the mechanical isolating contact unit
- voltage determination across the electronic interruption unit is used to: identify a broken-down or blown state of a power semiconductor
- enabling the possibility to switch on the mechanical isolating contact unit after a fault-free check of the electronic interruption unit
- possibility of opening the mechanical isolating contact unit after a fault in the electronic interruption unit has been determined.

Although the invention has been described and illustrated more specifically in detail by means of the exemplary embodiment, the invention is not restricted by the disclosed examples and other variations may be derived therefrom by a person skilled in the art without departing from the scope of protection of the invention.

The invention claimed is:

1. A circuit breaker device for protecting an electrical low-voltage AC circuit, comprising:

- a housing having at least one network-side connection and one load-side connection;
- an electronic interruption unit having semiconductor-based switching elements;
- a mechanical isolating contact unit connected in series with said electronic interruption unit and having contacts, wherein said mechanical isolating contact unit is assigned to said load-side connection and said electronic interruption unit is assigned to said at least one network-side connection, wherein said mechanical isolating contact unit is switched by opening said contacts in order to avoid a current flow or closing said contacts for the current flow in the low-voltage AC circuit;

said electronic interruption unit being switched, by means of said semiconductor-based switching elements, to a high-impedance state of said semiconductor-based switching elements in order to avoid the current flow or a low-impedance state of said semiconductor-based switching elements for the current flow in the electrical low-voltage AC circuit;

a current sensor for determining a level of a current of the electrical low-voltage AC circuit;

a controller connected to said current sensor, said mechanical isolating contact unit and said electronic interruption unit, wherein avoidance of the current flow in the electrical low-voltage AC circuit is initiated if current limit values and/or current-time limit values are exceeded; and wherein the circuit breaker device is configured such that a level of voltage across said electronic interruption unit is determined for one conductor, wherein the functionality of said electronic interruption unit is determined from the level of the voltage across said electronic interruption unit.

2. The circuit breaker device according to claim 1, wherein said electronic interruption unit has a network-side connecting point and a load-side connecting point; and further comprising a first voltage sensor connected to said controller which determines a level of a first voltage, as the level of the voltage across said electronic interruption unit, between said network-side connecting point and said load-side connecting point of said electronic interruption unit.

3. The circuit breaker device according to claim 2, wherein said at least one network-side connection has a network-side neutral conductor connection and a network-side phase conductor connection;

further comprising a second voltage sensor connected to said controller and determining a level of a second voltage between said network-side neutral conductor connection and said network-side phase conductor connection;

further comprising a third voltage sensor connected to said controller and determining a level of a third voltage between said network-side neutral conductor connection and said load-side connecting point of said electronic interruption unit; and wherein said circuit breaker device is configured such that the level of the first voltage is determined, as the level of the voltage across the electronic interruption unit, from a difference between the second and third voltages.

4. The circuit breaker device according to claim 3, further comprising an energy supply connected to said network-side neutral conductor connection and to said network-side phase conductor connection;

further comprising a fuse and/or a switch in a link to said network-side neutral conductor connection; and further comprising a measurement impedance connected to said network-side neutral conductor connection via said fuse.

5. The circuit breaker device according to claim 3, wherein the circuit breaker device is configured such that, when said contacts of said mechanical isolating contact unit are closed and said electronic interruption unit has been switched to the high impedance state, said electronic interruption unit is switched to the low-impedance state for a period of time and the level of the voltage across said electronic interruption unit is determined, in that, if a voltage threshold value is exceeded, there is a fault condition which prevents said electronic interruption unit from being switched to the low impedance state and/or initiates opening of said contacts.

6. The circuit breaker device according to claim 5, wherein said electronic interruption unit is switched to the low-impedance state when an instantaneous value of a voltage between said network-side neutral conductor connection and said network-side phase conductor connection undershoots a fourth voltage threshold value.

7. The circuit breaker device according to claim 3, wherein the circuit breaker device is configured such that, when said contacts of said mechanical isolating contact unit are closed and said electronic interruption unit has been switched to the low impedance state, said electronic interruption unit is switched to the high-impedance state for a period of time and the level of the voltage across said electronic interruption unit is determined, in that, if a voltage threshold value is undershot, there is a fault condition which initiates said electronic interruption unit coming to have the high impedance state and/or initiates opening of said contacts.

8. The circuit breaker device according to claim 7, wherein said electronic interruption unit is switched to the high-impedance state when an instantaneous value of the voltage between said network-side neutral conductor connection and said network-side phase conductor connection exceeds a seventh voltage threshold value.

9. The circuit breaker device according to claim 2, wherein the circuit breaker device is configured such that said contacts of said mechanical isolating contact unit being opened, but not closed, by said controller.

10. The circuit breaker device according to claim 1, wherein said current sensor is disposed on a circuit side between said network-side phase conductor connection and said load-side phase conductor connection.

11. The circuit breaker device according to claim 1, wherein said mechanical isolation contact unit has network-side connection points; and further comprising a measurement impedance connected between said network-side connection points of said mechanical isolating contact unit.

12. The circuit breaker device according to claim 1, wherein said electronic interruption unit is one of a plurality of electronic interruption units;

wherein the electrical low-voltage AC circuit is a three-phase AC circuit; and further comprising further network-side and load-side phase conductor connections, between each of which one of said electronic interruption units and one of said contacts of said mechanical isolating contact unit are provided.

13. The circuit breaker device according to claim 1, wherein said mechanical isolating contact unit has a mechanical handle (HH) and being operated by means of said mechanical handle in order to switch to opening of said contacts or to closing of said contacts.

14. The circuit breaker device according to claim 13, wherein said mechanical isolating contact unit is configured such that it is possible to close said contacts by means of said mechanical handle only after an enable signal.

15. The circuit breaker device according to claim 1, wherein when said contacts of said mechanical isolating contact unit are closed and said electronic interruption unit has the low impedance state and:

when the current that exceeds a first current value is determined, said electronic interruption unit comes to have the high impedance state and said mechanical isolating contact unit remains closed;

when the current that exceeds a second current value is determined, said electronic interruption unit comes to have the high impedance state and said mechanical isolating contact unit is opened; and when the current that exceeds a third current value is determined, said electronic interruption unit comes to have the high impedance state and said mechanical isolating contact unit is opened.

16. The circuit breaker device according to claim 1, wherein the circuit breaker device is configured such that, when said contacts of said mechanical isolating contact unit are open and said electronic interruption unit has been switched to the high impedance state, the level of the voltage across said electronic interruption unit is determined, in that there is a first fault condition if a first voltage threshold value is undershot, with a result that said electronic interruption unit is prevented from coming to have the low impedance state and/or closing of said contacts is prevented.

17. The circuit breaker device according to claim 16, wherein the circuit breaker device is configured such that, when said contacts of said mechanical isolating contact unit are open and said electronic interruption unit has been switched to the high impedance state, said electronic interruption unit is switched to the low-impedance state for a first period of time and the level of the voltage across said electronic interruption unit is determined, in that there is a second fault condition if a second voltage threshold value is exceeded, with a result that said electronic interruption unit is prevented from further coming to have the low impedance state and/or closing of said contacts is prevented.

18. The circuit breaker device according to claim 17, wherein when there is the first fault condition or the second fault condition, closing of said contacts of said mechanical isolating contact unit is prevented.

19. The circuit breaker device according to claim 1, wherein the circuit breaker device is configured such that, when said contacts of said mechanical isolating contact unit are closed and said electronic interruption unit has been switched to the low impedance state, the level of the voltage across said electronic interruption unit is determined, in that, if a voltage threshold value is exceeded, there is a fault condition which initiates said electronic interruption unit coming to have the high impedance state and/or initiates opening of said contacts.

20. The circuit breaker device according to claim 1, wherein said controller has a microcontroller.

21. A method for protecting an electrical low-voltage AC circuit with a circuit breaker device, the circuit breaker device having:

a housing with at least one network-side connection and one load-side connection;

an electronic interruption unit having semiconductor-based switching elements;

a mechanical isolating contact unit connected in series with said electronic interruption unit and having contacts, wherein said mechanical isolating contact unit is assigned to the load-side connection and the electronic interruption unit is assigned to the network-side connection, wherein the mechanical isolating contact unit is switched by opening the contacts in order to avoid a current flow or closing the contacts for the current flow in the electrical low-voltage AC circuit;

the electronic interruption unit being switched, by means of the semiconductor-based switching elements, to a high-impedance state of the semiconductor-based switching elements in order to avoid the current flow or a low-impedance state of the semiconductor-based switching elements for the current flow in the electrical low-voltage AC circuit;

the method comprises the steps of:

determining a level of a current in the electrical low-voltage AC circuit;

initiating an avoidance of the current flow in the electrical low-voltage AC circuit if current limit values and/or current-time limit values are exceeded;

determining a level of a voltage across the electronic interruption unit for one conductor; and determining a functionality of the electronic interruption unit based on the level of the voltage across the electronic interruption unit.

22. The method according to claim 21, which further comprises determining the level of the voltage across the electronic interruption unit if the contacts of the mechanical isolating contact unit are open and the electronic interruption unit has been switched to the high impedance state, in that there is a first fault condition if a first voltage threshold value is undershot, with a result that the electronic interruption unit is prevented from coming to have the low impedance state and/or closing of the contacts is prevented.

23. The method according to claim 22, which further comprises preventing the closing of the contacts of the mechanical isolating contact unit if there is the first fault condition.

24. The method according to claim 21, wherein when the contacts of the mechanical isolating contact unit are open and the electronic interruption unit has been switched to the high impedance state, the electronic interruption unit is switched to the low-impedance state for a first period of time and the level of the voltage across the electronic interruption unit is determined, in that there is a fault condition if a voltage threshold value is exceeded, with a result that the electronic interruption unit is prevented from further coming to have the low impedance state and/or closing of the contacts is prevented.

25. The method according to claim 21, wherein when the contacts of the mechanical isolating contact unit are closed and the electronic interruption unit has been switched to the high impedance state, the electronic interruption unit is switched to the low-impedance state for a period of time and the level of the voltage across the electronic interruption unit is determined, in that, if a voltage threshold value is exceeded, there is a fault condition which prevents the electronic interruption unit from coming to have the low impedance state and/or initiates opening of the contacts.

26. The method according to claim 25, which further comprises switching the electronic interruption unit to the low-impedance state when an instantaneous value of a voltage between a network-side neutral conductor connection and a network-side phase conductor connection undershoots a further voltage threshold value.

27. The method according to claim 21, wherein when the contacts of the mechanical isolating contact unit are closed and the electronic interruption unit has been switched to the low impedance state, the level of the voltage across the electronic interruption unit is determined, in that, if a voltage threshold value is exceeded, there is a fault condition which initiates the electronic interruption unit coming to have the high impedance state and/or initiates opening of the contacts.

28. The method according to claim 21, wherein when the contacts of the mechanical isolating contact unit are closed and the electronic interruption unit has been switched to the low impedance state, the electronic interruption unit is switched to the high-impedance state for a period of time and the level of the voltage across the electronic interruption unit is determined, in that, if a voltage threshold value is undershot, there is a fault condition which initiates the electronic interruption unit coming to have the high impedance state and/or initiates opening of the contacts.

29. A non-transitory computer program product comprising computer executable instructions which, when executed by a microprocessor perform the method according to claim 21.

30. A non-transitory computer-readable storage medium having computer executable instruction which when executed on a microprocessor perform the method according to claim 21.

* * * * *